(12) United States Patent
Yang et al.

(10) Patent No.: US 11,956,082 B2
(45) Date of Patent: Apr. 9, 2024

(54) CODEBOOK DETERMINATION FOR TRI-STATE HARQ-ACK FEEDBACK

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 17/343,621

(22) Filed: Jun. 9, 2021

(65) Prior Publication Data

US 2022/0021486 A1   Jan. 20, 2022

Related U.S. Application Data

(60) Provisional application No. 63/054,108, filed on Jul. 20, 2020.

(51) Int. Cl.
*H04W 72/23* (2023.01)
*H04L 1/1812* (2023.01)
*H04W 76/28* (2018.01)

(52) U.S. Cl.
CPC .......... *H04L 1/1812* (2013.01); *H04W 72/23* (2023.01); *H04W 76/28* (2018.02)

(58) Field of Classification Search
CPC .... H04L 1/1812; H04W 76/28; H04W 72/23; H04W 72/0446; H04W 72/042
See application file for complete search history.

(56) References Cited

U.S. PATENT DOCUMENTS

| | | | |
|---|---|---|---|
| 2019/0082456 A1* | 3/2019 | Kim | H04L 27/2602 |
| 2020/0295878 A1* | 9/2020 | Choi | H04W 72/23 |
| 2020/0382997 A1 | 12/2020 | Nemeth et al. | |
| 2021/0328728 A1* | 10/2021 | El Hamss | H04L 5/0091 |
| 2021/0345171 A1* | 11/2021 | Yi | H04W 28/06 |
| 2022/0174707 A1* | 6/2022 | Kim | H04W 72/23 |
| 2022/0201725 A1* | 6/2022 | Liu | H04L 1/1812 |
| 2023/0006798 A1* | 1/2023 | Lee | H04L 1/1607 |
| 2023/0059876 A1* | 2/2023 | Pan | H04W 76/27 |

* cited by examiner

*Primary Examiner* — Wei Zhao
(74) *Attorney, Agent, or Firm* — Procopio, Cory, Hargreaves & Savitch

(57) ABSTRACT

Aspects presented herein may enhance a HARQ feedback operation to improve data retransmissions by using tri-state HARQ feedback, and may enable a UE to construct a codebook for tri-state HARQ feedback. In one aspect, a UE determines whether tri-state HARQ feedback or bi-state HARQ feedback is configured based on a DL carrier. The UE generates HARQ feedback for at least one of a received PDCCH or a received PDSCH on the DL carrier based on the determination whether the DL carrier is configured with the tri-state HARQ feedback. The UE transmits the generated HARQ feedback.

28 Claims, 15 Drawing Sheets

CODEBOOK DETERMINATION FOR TRI-STATE HARQ-ACK FEEDBACK

CROSS REFERENCE TO RELATED APPLICATION(S)

This application claims the benefit of and priority to U.S. Provisional Application Ser. No. 63/054,108, entitled "CODEBOOK DETERMINATION FOR TRI-STATE HARQ-ACK FEEDBACK" and filed on Jul. 20, 2020, which is expressly incorporated by reference herein in its entirety.

TECHNICAL FIELD

The present disclosure relates generally to communication systems, and more particularly, to wireless communication involving a tri-state feedback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus determines whether tri-state hybrid automatic repeat request (HARQ) feedback or bi-state HARQ feedback is configured based on a downlink (DL) carrier. The apparatus generates HARQ feedback for at least one of a received physical downlink control channel (PDCCH) or a received physical downlink shared channel (PDSCH) on the DL carrier based on the determination whether the DL carrier is configured with the tri-state HARQ feedback. The apparatus transmits the generated HARQ feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
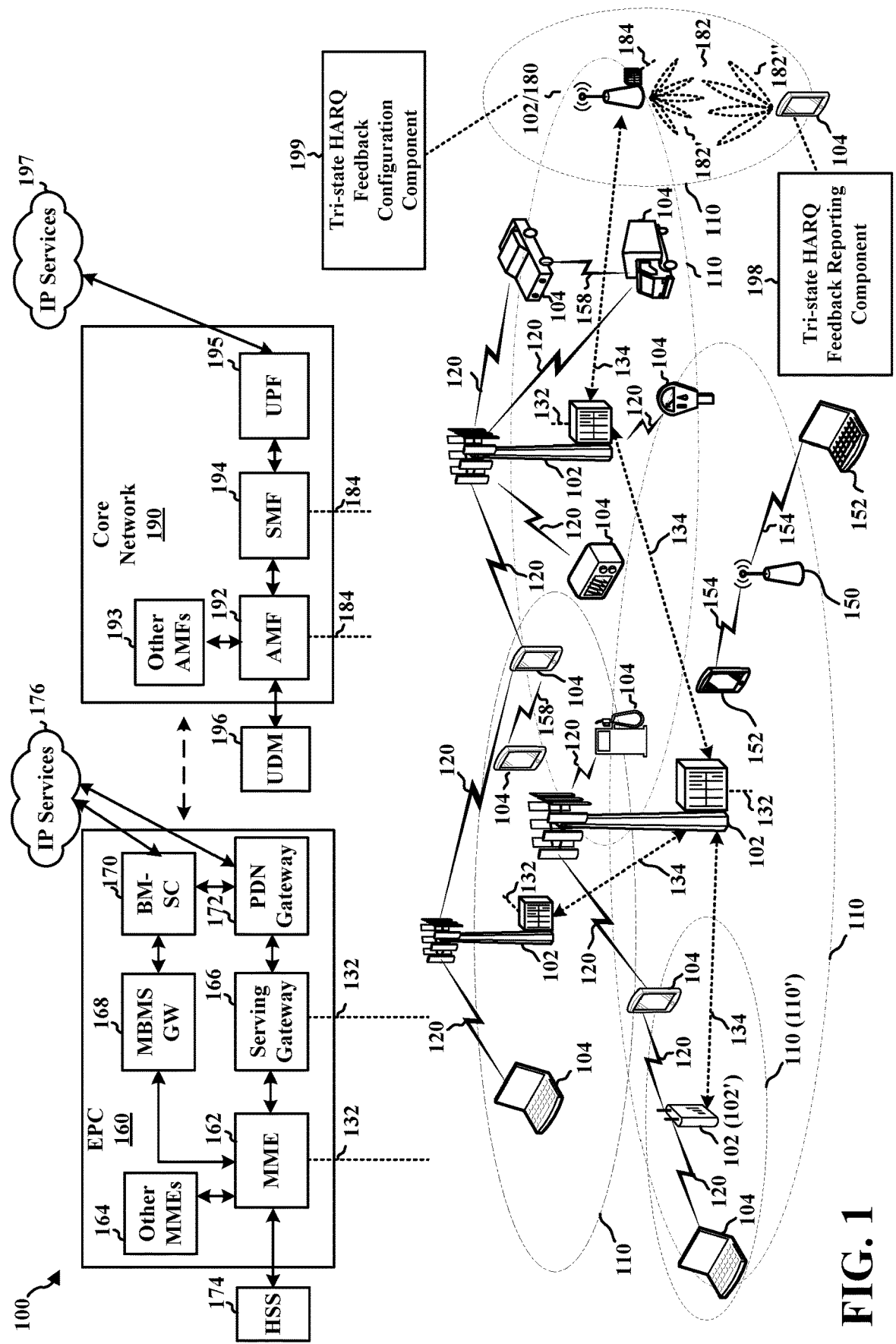
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100. In certain aspects, the UE 104 may include a Tri-state HARQ Feedback Reporting Component 198 configured to determine whether a DL carrier is configured with the tri-state HARQ. The Tri-state HARQ Feedback Reporting Component 198 may generate a HARQ feedback for a PDCCH or a PDSCH depending on the decoding result of the PDCCH or the PDSCH, and may multiplex the HARQ feedback to a codebook and send the codebook to a base station. In certain aspects, the base station 102/180 may include a Tri-state HARQ Feedback Configuration Component 199 configured to indicate to the UE whether the tri-state HARQ feedback is to be used for a DL carrier, and may receive the tri-state HARQ feedback based on the indication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
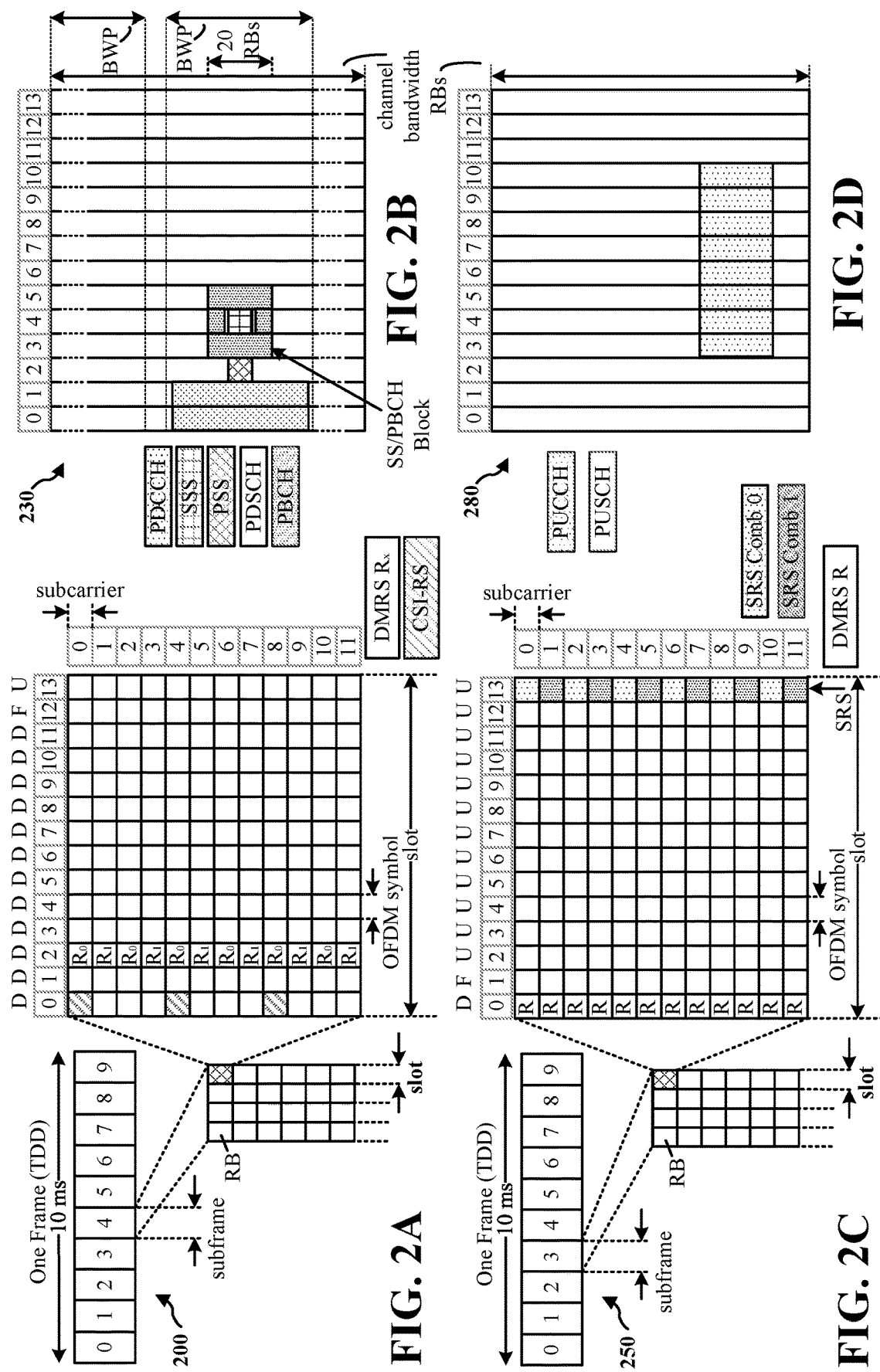
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
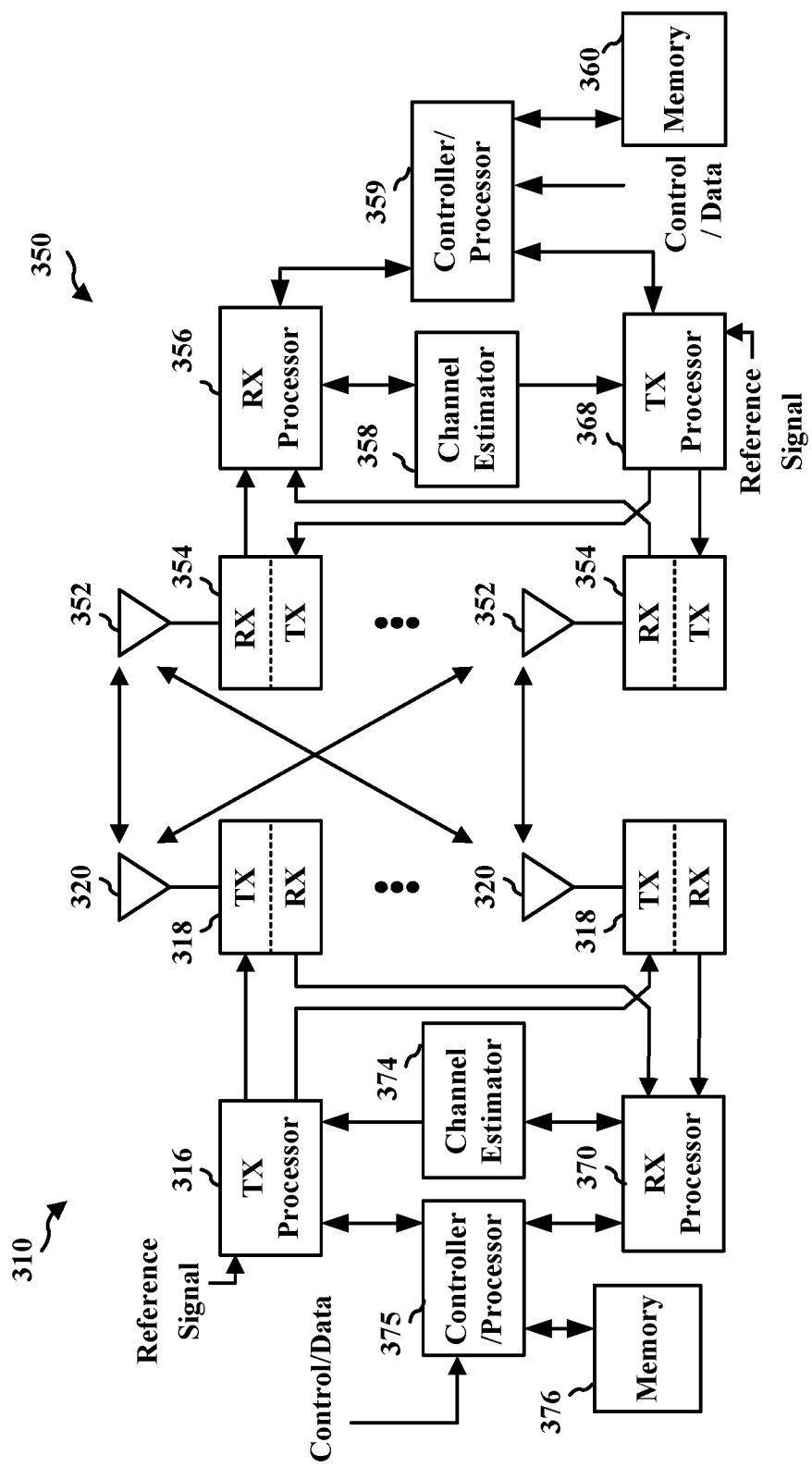
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the Tri-state HARQ Feedback Reporting Component 198 of FIG. 1.

At least one of the TX processor 316, the RX processor 370, and the controller/processor 375 may be configured to perform aspects in connection with the Tri-state HARQ Feedback Configuration Component 199 of FIG. 1.

A UE may transmit hybrid automatic repeat request (HARQ) feedback (e.g., an acknowledgment (ACK) or a negative-acknowledgement (NACK)) to indicate a decoding result of a physical downlink shared channel (PDSCH) to a base station. For example, as shown by diagram 400 of FIG. 4, at 406, a base station 404 may transmit a downlink (DL) grant (e.g., via downlink control information (DCI) of a physical downlink control (PDCCH)) to a UE 402, where the DL grant may schedule a resource for the UE 402 to receive a PDSCH. The DL grant may also request the UE 402 to provide a HARQ feedback for the PDSCH, and may include a feedback gap indicator 412 (e.g., a K1 value) corresponding to a time gap between the PDSCH message and the time in which the UE 402 is expected to send a corresponding physical uplink control channel (PUCCH) message carrying the HARQ feedback message for the PDSCH message. At 408, the UE 402 may receive the scheduled PDSCH from the base station 404. Based on the decoding result of the PDSCH, at 410, the UE 402 may transmit the HARQ feedback to the base station 404 indicating whether the PDSCH has been successfully decoded. For example, if the UE 402 successfully decodes the PDSCH, at 410, the UE 402 may transmit a positive HARQ feedback (e.g., an ACK) back to the base station 404. On the other hand, if the UE 402 is unable to decode the PDSCH, such as not receiving the PDSCH or the decoding fails, at 410, the UE 402 may transmit a negative HARQ feedback (e.g., a NACK) back to the base station 404. A 1-bit HARQ feedback may be generated per transport block (TB) or per code block group (CBG) in case the CBG is configured for the UE 402. For purpose of the present disclosure, a HARQ feedback with HARQ-ACK and HARQ-NACK may be referred to as a "normal HARQ feedback" or "bi-state HARQ feedback."

When a base station (e.g., the base station 404) receives a negative feedback (e.g., a HARQ-NACK) from a UE (e.g., the UE 402) for a PDSCH based on the bi-state HARQ feedback, the base station may not be able to identify whether the decoding failure is caused by the PDSCH not being successfully transmitted to or decoded by the UE, or caused by the PDCCH corresponding to the PDSCH not being successfully transmitted to or decoded by the UE. In other words, the base station may not be able to identify whether the decoding failure is associated with the PDCCH or the PDSCH. As a result, the base station may be configured to retransmit both the PDSCH and the PDCCH in response to the negative feedback.

Aspects presented herein may enhance the efficiency of HARQ feedback and data (e.g., PDSCH or PDCCH) retransmission operations, where one or more decoding information may be added to the HARQ feedback to enable the base station to identify the reason for the decoding failure (e.g., whether the decoding failure is associated with the PDSCH or the PDCCH). As such, aspects presented herein may enable the base station to provide better scheduling for retransmissions.

Figure 5:
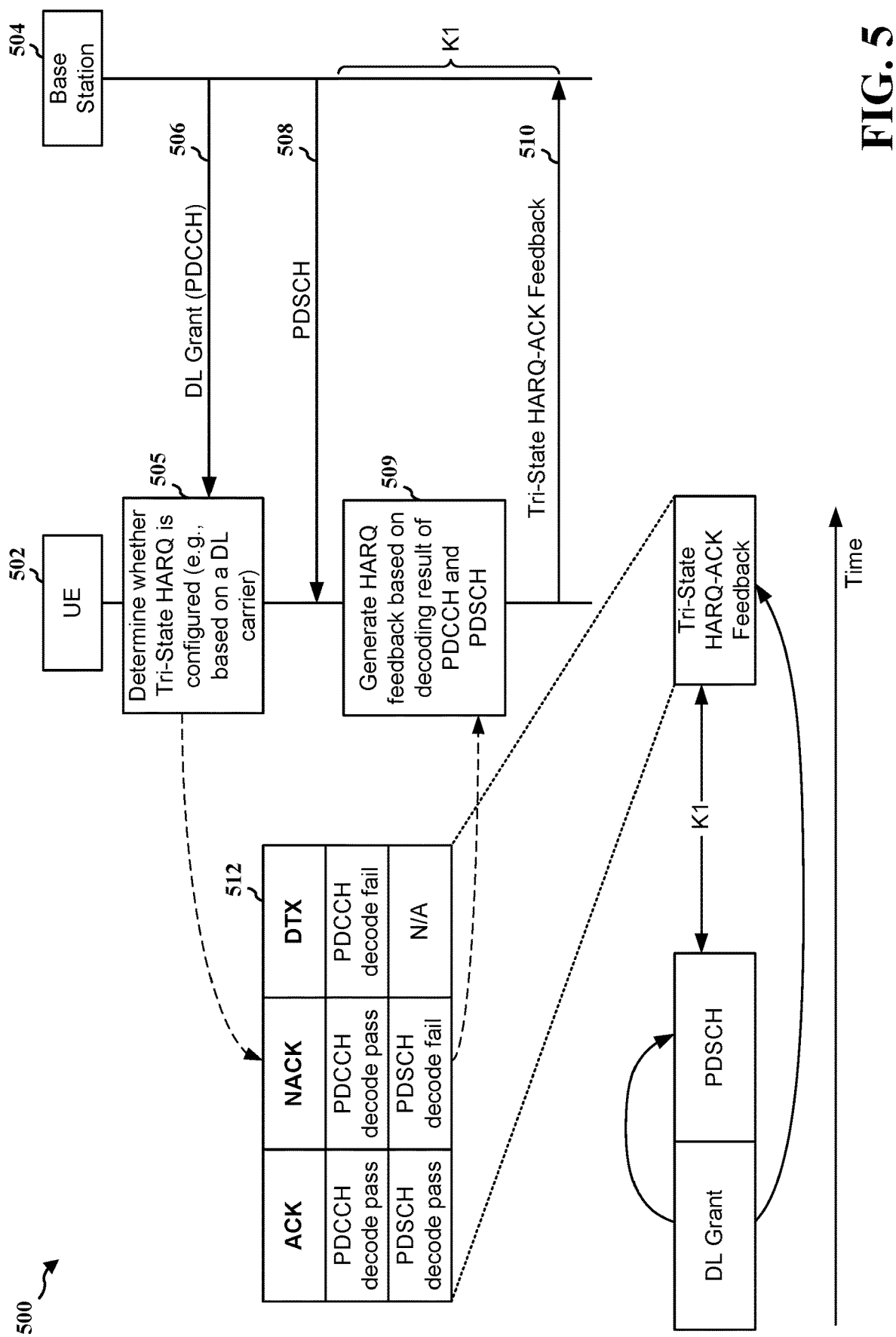
FIG. 5 is a communication flow illustrating an example of tri-state HARQ-ACK reporting in accordance with various aspects of the present disclosure.

In one aspect of the present disclosure, as shown by a diagram 500 of FIG. 5, a HARQ feedback with at least three reporting states may be provided or configured for a UE 502 and/or a base station 504. At 505, the UE 502 may determine whether the HARQ feedback with three reporting states is configured for the UE 502 based on a DL carrier (e.g., whether the DL carrier is configured with the HARQ feedback with three states or whether the DL carrier indicates the HARQ feedback with three states is to be used for HARQ reporting, etc.). In one example, as shown at 512, the HARQ feedback with three reporting states may include a first state (e.g., an ACK state) that indicates the PDCCH (e.g., transmitted by the base station 504 at 506 containing a DL grant) and the PDSCH (e.g., transmitted by the base station 504 at 508) have been successfully decoded by the UE 502, a second state (e.g., a NACK state) that indicates the PDCCH has been successfully decoded by the UE 502, but the PDSCH has not been successfully decoded by the UE 502, and a third state (a "discontinuous transmission" or "DTX" state) that indicates or implies the PDCCH has not been successfully decoded by the UE 502.

At 506 and 508, the base station 504 may transmit a PDCCH and a PDSCH to the UE 502. Based on the decoding result of the PDCCH and/or the PDSCH, at 509, the UE may generate a HARQ feedback for the PDCCH and/or the PDSCH using one of the three states. At 510, the UE 502 may report the generated HARQ feedback state to the base station 504. Based on the HARQ feedback (e.g., the HARQ feedback with three reporting states), the base station 504 may be able to identify whether the decoding failure is associated with the decoding of the PDCCH or the PDSCH, and the base station 504 may reschedule the retransmission (s) for the PDCCH or the PDSCH accordingly. For purpose of the present disclosure, a HARQ feedback with three types of feedback or three reporting states (e.g., ACK, NACK and DTX) may be referred to as a "tri-state HARQ feedback" or a "tri-state HARQ-ACK feedback." In one example, when the tri-state HARQ feedback is enabled for a UE (e.g., the UE 502), the UE may use the tri-state HARQ feedback or send the DTX feedback to a serving base station (e.g., the base station 504) if there are more than one transport block (TB) or PDSCH to be acknowledged. However, when there is one TB or PDSCH that is to be acknowledged, the UE may be configured not to use/apply the tri-state HARQ feedback or send the DTX feedback, as a priori the UE may not know or be aware that there is a PDCCH that has been missed.

For a bi-state HARQ feedback, a base station may schedule multiple HARQ feedbacks in the same slot for a UE, in which case the UE may be configured to multiplex multiple ACK or NACK feedbacks in a same codebook, e.g., arranging the feedbacks into a transmission. In order to align the HARQ feedback codebook (may also be referred to as a "HARQ-ACK feedback codebook") and the codebook size between the base station and the UE, multiple types of codebooks may be used by the base station and the UE. For example, types of codebooks may include a semi-static codebook (e.g., Type 1), a dynamic codebook (e.g., Type 2), and/or a per HARQ process codebook (e.g., Type 3), etc.

Figure 6:
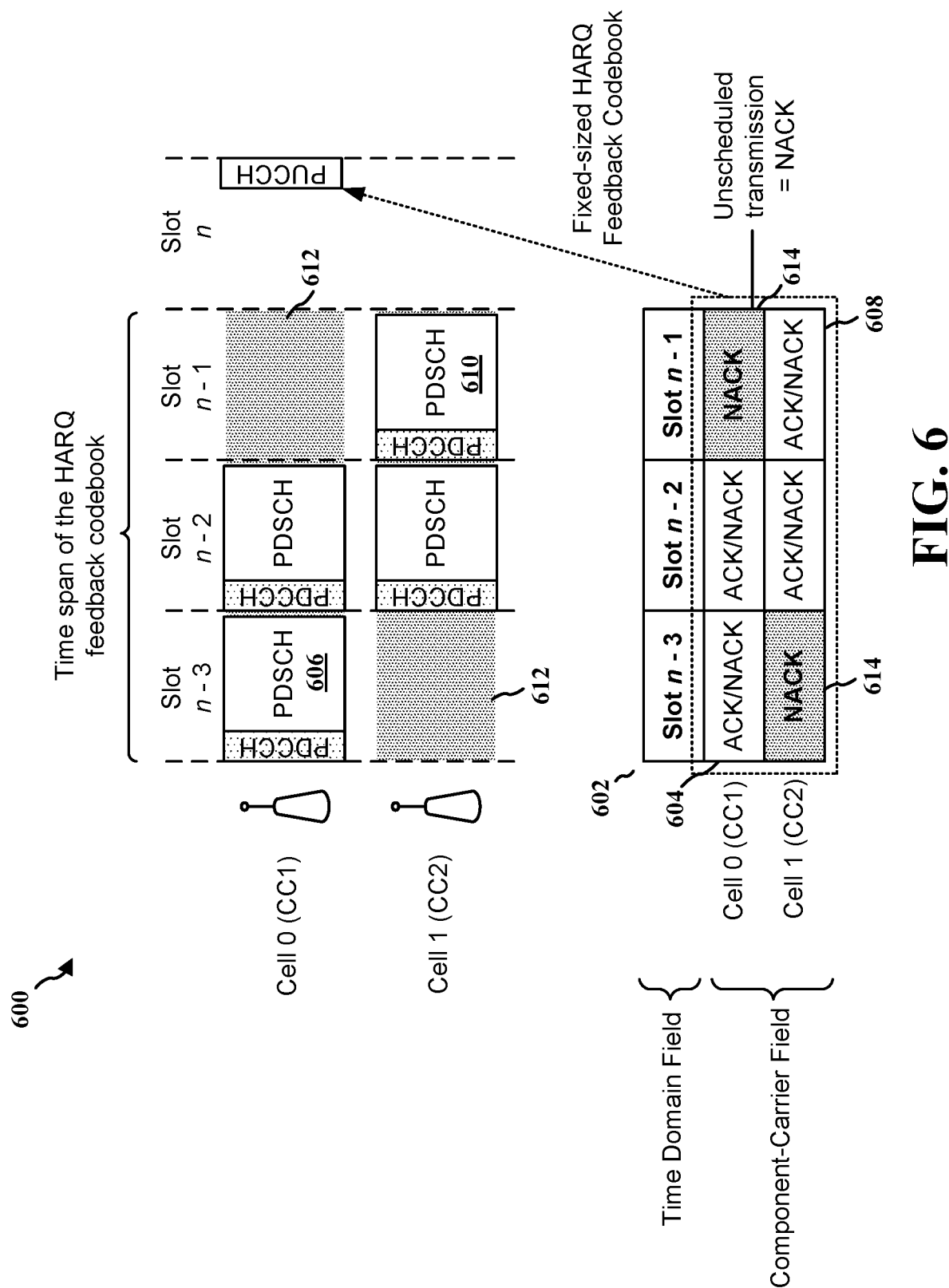
FIG. 6 is a diagram illustrating an example of a semi-static codebook in accordance with various aspects of the present disclosure.

FIG. 6 is a diagram 600 illustrating an example of a semi-static codebook (e.g., Type 1) for a bi-state HARQ feedback in accordance with various aspects of the present disclosure. For a semi-static codebook, the size of the codebook may be fixed (e.g., the codebook has a fixed amount of bits) regardless of how many actual HARQ feedbacks (e.g., HARQ-ACK bits) are expected by the base station from the UE. The base station may configure the size of the semi-static codebook for the UE through one or more radio resource control (RRC) parameters, and both the UE and the base station may determine the location of the actual HARQ feedback(s) in the codebook based on a defined/ predetermined rule. For example, as shown by FIG. 6, the semi-static codebook may be represented by a matrix 602 having a time-domain field (slot n−3, slot n−2, slot n−1, etc.) and a component-carrier (CC) field (e.g., CC1, CC2, etc.), where both the time domain field and the CC field may be semi-statically configured. In one example, the time slots n−3 to n−1 may indicate a time span of the HARQ feedback codebook (e.g., three slots), and the time slot n may indicate the slot in which the HARQ feedbacks are to be reported by the UE to the base station (e.g., in a PUCCH). As the codebook size may be fixed for the semi-static codebook, the number of bits to transmit in a HARQ feedback may be known by the UE and the base station (e.g., one (1) bit per feedback for the bi-state HARQ feedback). Each entry in the matrix 602 may indicate whether a corresponding PDSCH has been successfully decoded by the UE (e.g., ACK=successfully decoded, NACK=unsuccessfully decoded). For example, an entry 604 of the matrix 602 may indicate whether a PDSCH 606 received from a first cell (e.g., cell #0) or a first component carrier (CC1) at the time slot n−3 is successfully decoded, the entry 608 of the matrix 602 may indicate whether a PDSCH 610 received from a second cell (e.g., cell #1) or a second component carrier (CC2) at the time slot n−1 is successfully decoded, etc. The UE may also be configured to send or indicate a NACK (e.g., at shown at an entry 614) for unscheduled transmission(s) 612.

Figure 7:
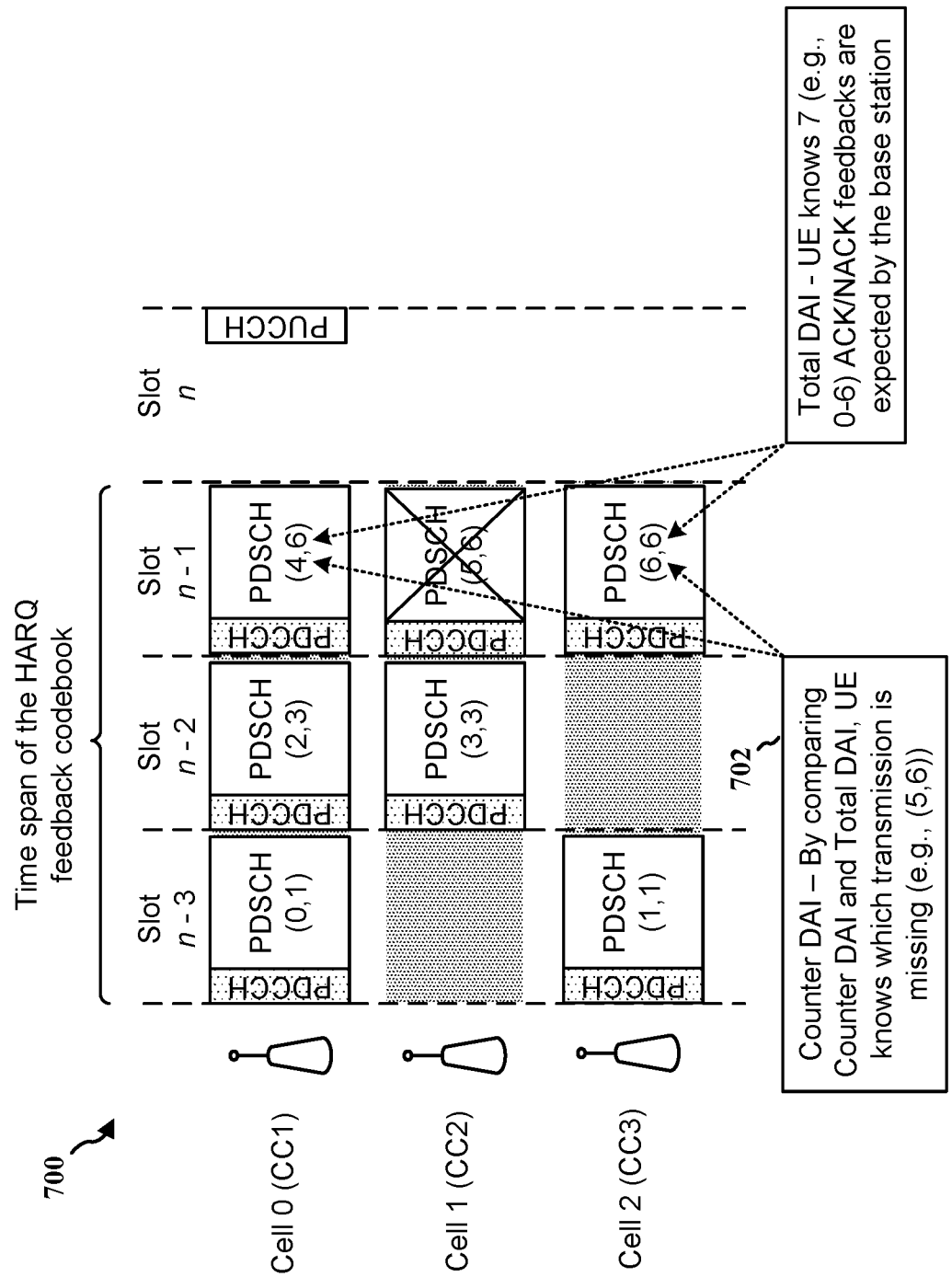
FIG. 7 is a diagram illustrating an example of a dynamic codebook in accordance with various aspects of the present disclosure.

FIG. 7 is a diagram 700 illustrating an example of a dynamic codebook (e.g., Type 2) in accordance with various aspects of the present disclosure. For the dynamic codebook, the size of the codebook may vary in each transmission, where the size of the codebook (e.g., number of feedbacks expected by a serving base station) may be indicated by a base station using a downlink assignment indication (DAI) field in the DL grant (e.g., in a DCI). The DAI field may further include a counter DAI (cDAI) field and a total DAI (tDAI) field, where the cDAI field may indicate a number of scheduled PDSCH up to the point that the DCI (e.g., the DCI scheduling the PDSCH) is received, and the tDAI field may indicate a total number of downlink transmissions across all carriers up to this point in time (e.g., the highest cDAI at this point in time). For example, as shown by FIG. 7, a base station may schedule seven PDSCHs (e.g., PDSCH #0 to #6) to be transmitted to a UE from three cells (e.g., cell 1, cell2, and cell3) or using component carriers (e.g., CC1, CC2, and CC3), where each PDSCH may be associated with a DAI parameter: (cDAI, tDAI). For example, the DAI parameter (0, 1) may indicate that the corresponding PDSCH is the PDSCH #0 (e.g., the first PDSCH) in the transmission and a total of two PDSCHs (e.g., tDAI=1 as the counting starts with 0) are expected to be transmitted up to this point in time (e.g., at the time slot n−3), the DAI parameter (2, 3) may indicate that the corresponding PDSCH is the PDSCH #2 (e.g., the third PDSCH) in the transmission and a total of four PDSCHs (e.g., tDAI=3 as the counting starts with 0) are expected to be transmitted up to this point (e.g., at the time slot n−2), and the DAI parameter (4, 6) may indicate that the PDSCH is the PDSCH #4 (e.g., the fifth PDSCH) in the transmission and a total of seven PDSCHs (e.g., tDAI=6 as the counting starts with 0) are expected to be transmitted up to this point (e.g., at time slot n−1), etc. Thus, based on information provided by the tDAI and the cDAI fields, the UE may determine how many HARQ feedbacks are expected by the base station and/or if any PDSCH(s) is missing. For example, as shown at 702, if the UE receives PDSCHs with DAI parameters (4, 6) and (6, 6) without receiving a PDSCH with a DAI parameter (5, 6), as the UE may know that the base station is expecting seven HARQ feedbacks based on the tDAI value (e.g., tDAI=6), the UE may determine or identify that PDSCH #5 (e.g., the sixth PDSCH) is missing based on the cDAI. As such, the UE may generate a HARQ feedback for each PDSCH received based on the decoding result of the PDSCH (e.g., ACK=successfully decoded, NACK=unsuccessfully decoded), and the UE may also report the missing PDSCH (e.g., PDSCH #5) to the base station, such as by sending a NACK. For the dynamic codebook, as the acknowledgment information for the scheduled PDSCH may be included in the HARQ feedback and the HARQ feedback may not include acknowledgment information for unscheduled transmissions, the size of the codebook may vary dynamically as a function of the number of the scheduled carriers.

For the per HARQ process codebook (e.g., Type 3) in a bi-state HARQ feedback, the size of the codebook may be fixed, and the size of the codebook may be determined based on the number of downlink cells and the number of HARQ processes configured on each of the downlink cells. For example, if a UE is configured with 16 HARQ processes, the UE may generate a codebook with 16 bits (e.g., one (1) bit per feedback for the bi-state HARQ feedback), where each bit may indicate the decoding result of the most recent PDSCH received in the corresponding HARQ process (e.g., 1 or ACK=successfully decoded, 0 or NACK=unsuccessfully decoded, etc.).

Aspects presented herein may provide a codebook construction for the tri-state HARQ feedback, where a UE may use a semi-static (e.g., Type 1) codebook and/or a dynamic (e.g., Type 2) codebook for the tri-state HARQ feedback (e.g., ACK, NACK and DTX).

In one aspect of the present disclosure, a UE may use the semi-static codebook (e.g., Type 1) for the tri-state HARQ feedback, where the UE may determine or construct the codebook based on PDSCH occasions. For example, for each PDSCH occasion, the UE may generate or provide one tri-state feedback per TB (e.g., per PDSCH). In addition, the UE may generate tri-state HARQ feedback for PDSCHs on the carriers (e.g., serving cells) that are configured with the tri-state HARQ feedback. For example, for the cell(s) configured with the tri-state HARQ feedback, if the UE does not detect any PDSCH in a PDSCH occasion (e.g., in a PDSCH monitoring or receiving occasion), the UE may indicate the status DTX for that PDSCH occasion. Otherwise, if the UE detects a PDSCH (e.g., the UE has received a DL grant scheduling the PDSCH on the corresponding location), the UE may indicate the status ACK or NACK for the PDSCH depending on the decoding result (e.g., ACK=successfully decoded, NACK=unsuccessfully decoded). However, if a DL carrier is not configured with or does not support the tri-state HARQ feedback, then the UE may use the bi-state HARQ feedback (e.g., ACK and NACK) reporting instead and generate 1 bit per TB (or CBG) for the codebook, such as described in connection with FIG. 6.

Figure 8:
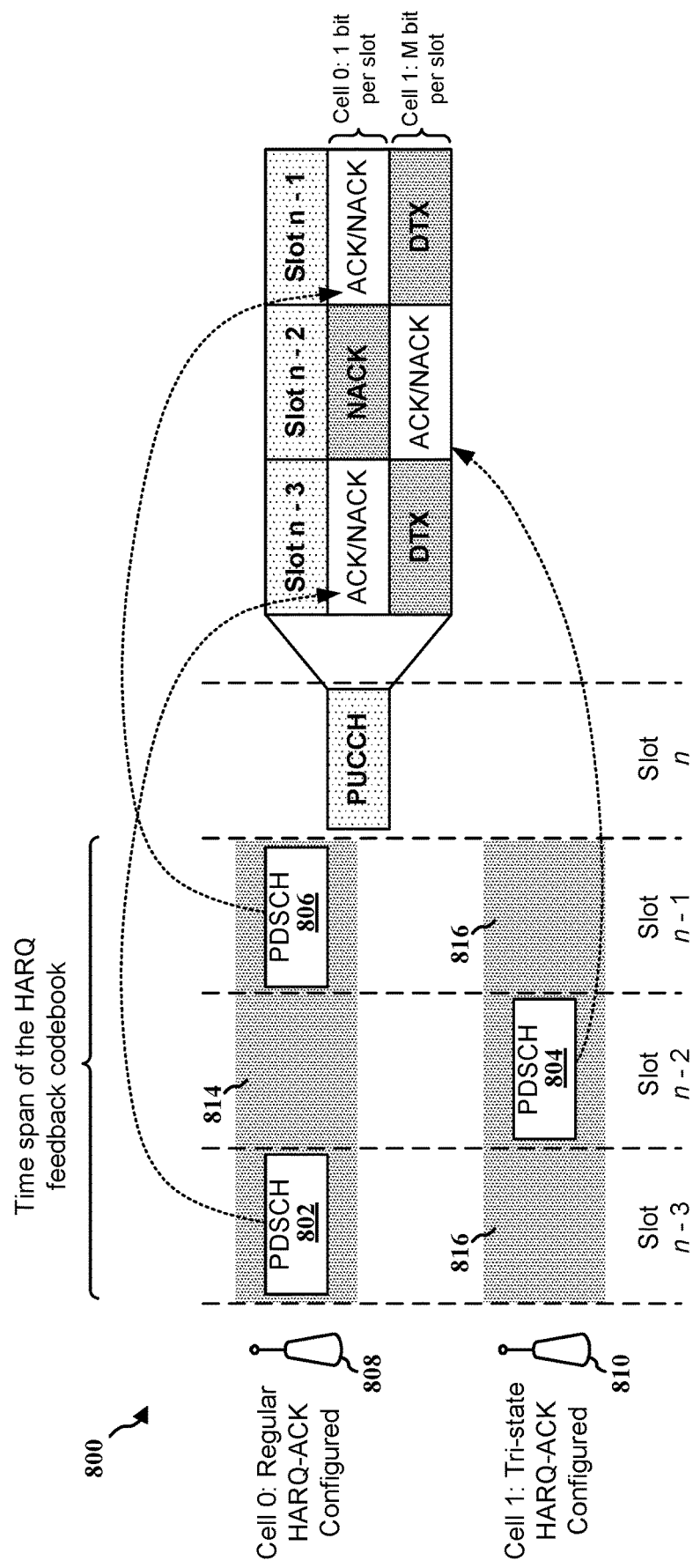
FIG. 8 is a diagram illustrating an example of constructing a semi-static codebook with the tri-state HARQ feedback reporting in accordance with various aspects of the present disclosure.

FIG. 8 is a diagram 800 illustrating an example of constructing a semi-static (e.g., Type 1) codebook with the tri-state HARQ feedback reporting in accordance with various aspects of the present disclosure. A base station may schedule three PDSCHs 802, 804, 806 to be transmitted to a UE during the time span from slot n−3 to slot n−1, where the PDSCH 802 and the PDSCH 806 may be scheduled to be transmitted from a first cell 808 (e.g., cell #0) that supports the bi-state HARQ feedback, and the PDSCH 804 may be scheduled to be transmitted from a second cell 810 (e.g., cell #1) that supports the tri-state HARQ feedback. For the transmission from the first cell 808 that supports the bi-state HARQ feedback, the UE may indicate an ACK or a NACK for each PDSCH received (e.g., PDSCHs 802, 806) based on the decoding result, and the UE may indicate a NACK for unscheduled transmission(s) 814. For the transmission from the second cell 810 that supports the tri-state HARQ feedback, the UE may indicate an ACK or a NACK for each PDSCH detected (e.g., PDSCH 804) based on the decoding result, such as described in connection with FIG. 5, and the UE may indicate a DTX for unscheduled transmission(s) 816. However, if the UE does not detect a PDSCH in a scheduled slot (e.g., if the PDSCH 804 is not detected), the UE may also indicate the DTX feedback for that PDSCH or slot.

In another aspect of the present disclosure, a UE may use the dynamic codebook (e.g., Type 2) for the tri-state HARQ feedback. In one example, the UE may determine or construct the codebook based on the DAI contained in the dynamic DL grant, and the UE may generate one tri-state feedback (e.g., ACK, NACK, DTX) for each received DL grant as well as the missing grants. Similar to the bi-state HARQ feedback using the dynamic codebook, the UE may determine or identify whether any DL grant is missing (e.g., not detected by the UE) based on information provided by the DAI (e.g., based on the cDAI and/or the tDAI fields). For example, referring back to FIG. 7, for PDSCHs with DAI parameters (0, 1), (1, 1), (2, 3), (3, 3), (4, 6) and (6, 6), the UE may send a tri-state feedback based on whether the PDSCH is detected and based on the decoding result of the PDSCH. If a PDSCH is detected and decoded, the UE may indicate an ACK for successful decoding of that PDSCH, and if a PDSCH is detected but not successfully decoded, the UE may indicate a NACK for that PDSCH. If a PDSCH is not detected, such as the PDSCH with DAI parameter (5, 6) in FIG. 7, the UE may indicate a DTX for that PDSCH.

In some examples, a UE may not be expected to report HARQ feedback based on the tri-state HARQ feedback if the per HARQ process codebook (e.g., Type 3) is configured for the UE. As the Type 3 HARQ feedback is per HARQ process, the UE may not know whether a data transmission (e.g., a PDSCH) received in a current HARQ process (and the corresponding HARQ feedback) is a most recent one and/or whether the most recent one is missing (e.g., due to missing PDCCH). As such, if the per HARQ process codebook is configured for the UE, the UE may generate the feedbacks using the bi-state HARQ feedback.

Aspects presented herein may enable a UE to multiplex the tri-state HARQ feedback with the bi-state HARQ feedback when both types of HARQ feedback are configured for the UE. In some examples, a UE may support both the tri-state HARQ feedback and the bi-state HARQ feedback, where the UE may be configured to multiplex the tri-state HARQ feedback with the bi-state HARQ feedback in a same codebook. Whether the UE is to perform the tri-state HARQ feedback or the bi-state HARQ feedback for a particular DL grant (e.g., PDSCH) may be determined based on dynamic DCI and/or RRC configuration transmitted from the base station. For example, through the RRC configuration, the base station may determine whether the DL cell is configured (e.g., on a DL serving cell) with the tri-state HARQ feedback or the bi-state HARQ feedback or both. If both types of HARQ feedback are configured, then the base station may use the DCI to dynamically indicate whether a feedback for a corresponding PDSCH is to be reported using the tri-state HARQ feedback or the bi-state HARQ feedback (e.g., based on a DCI format or a field in the DCI).

In one aspect of the present disclosure, a UE may multiplex the tri-state HARQ feedback with the bi-state HARQ feedback in a same codebook when the semi-static (e.g., Type 1) codebook is configured for the UE. In one example, on a DL carrier configured with the tri-state HARQ feedback, the UE may generate a tri-state HARQ feedback for each TB for each candidate PDSCH occasion, such as described in connection with FIG. 8. The UE may generate the tri-state HARQ feedback for each TB regardless of whether the actual grant that schedules the PDSCH indicates the tri-state HARQ feedback or the bi-state HARQ feedback, e.g., to make the size of the codebook fixed. On the other hand, for a DL carrier that is not configured with the tri-state HARQ feedback, the UE may use the bi-state HARQ feedback and generate 1 bit per TB (or CBG), where each bit may indicate ACK (e.g., 1) for successful PDSCH decoding or NACK (e.g., 0) for unsuccessful PDSCH decoding. The UE may then concatenate the tri-state HARQ (sub)-codebook with the bi-state HARQ (sub)-codebook, where concatenation may happen after converting the tri-state codebook to bits.

Figure 9:
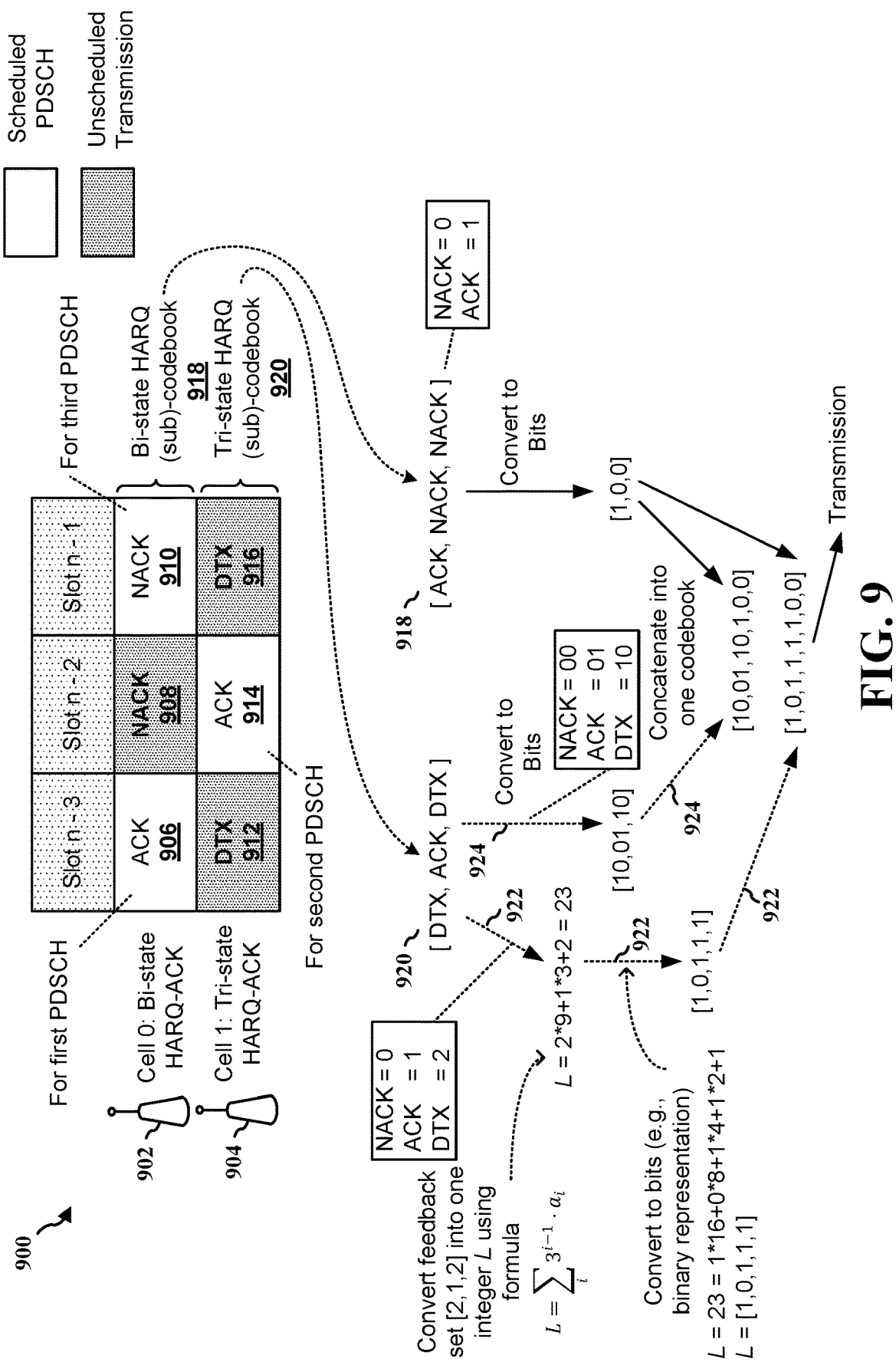
FIG. 9 is a diagram illustrating an example of multiplexing the tri-state HARQ feedback with the bi-state HARQ feedback in accordance with various aspects of the present disclosure.

FIG. 9 is a diagram 900 illustrating an example of multiplexing the tri-state HARQ feedback with the bi-state HARQ feedback in the same codebook based on the dynamic (Type 2) HARQ-ACK codebook construction in accordance with various aspects of the present disclosure. A base station may schedule three PDSCHs to be transmitted to a UE during the time span from slot n−3 to slot n−1. The first PDSCH and the third PDSCH may be scheduled to be transmitted at the time slot n−3 and the time slot n−1, respectively, from a first cell 902 (e.g., cell #0) that supports the bi-state HARQ feedback (e.g., a DL carrier configured with the bi-state HARQ feedback), and the second PDSCH may be scheduled to be transmitted at the time slot n−2 from a second cell 904 (e.g., cell #1) that supports the tri-state HARQ feedback (e.g., a DL carrier configured with the tri-state HARQ feedback). Based on the decoding result, the UE may generate a tri-state HARQ feedback for each TB for each candidate PDSCH occasion (e.g., the second PDSCH) that is configured with the tri-state HARQ feedback, and the UE may generate a bi-state HARQ feedback for each TB for each candidate PDSCH occasion (e.g., the first PDSCH and the third PDSCH) that is configured with the bi-state HARQ feedback. For example, the UE may have detected or received the first PDSCH and the third PDSCH from the first cell 902, where the first PDSCH is successfully decoded but the third PDSCH is unsuccessfully decoded. Thus, the UE may construct a bi-state HARQ (sub)-codebook 918 indicating [ACK 906, NACK 908, NACK 910] for the first PDSCH and the third PDSCH, where the ACK 906 may correspond to the decoding result of the first PDSCH, the NACK 908 may correspond to an unscheduled transmission (or an undetected PDSCH), and the NACK 910 may correspond to the decoding result of the third PDSCH. Similarly, the UE may have received and successfully decoded the second PDSCH from the second cell 904. Thus, the UE may construct a tri-state HARQ (sub)-codebook 920 indicating [DTX 912, ACK 914, DTX 916] for the second PDSCH, where the DTX 912 and the DTX 916 may correspond to unscheduled transmissions (or undetected PDSCHs), and the ACK 914 may correspond to the decoding result of the second PDSCH.

In some examples, the UE may convert the bi-state HARQ (sub)-codebook 918 and the tri-state HARQ (sub)-codebook 920 into bits before concatenate the codebooks, such as by assigning each of the ACK, NACK and DTX with a corresponding bit(s) (e.g., 0, 1, 00, 01, 10 etc.). In one example, the UE may first convert the tri-state HARQ (sub)-codebook 920 into one integer before converting it into bits. For example, as shown by a first path 922, the tri-state HARQ (sub)-codebook 920 may be represented by $[a_0, \ldots, a_{K-1}]$, where $a_i \in \{ACK, NACK, DTX\}$. Thus, the feedback set [DTX, ACK, DTX] may be represented by [$2_1$, $1_2$, $2_3$] if the ACK corresponds to 1, the NACK corresponds to 0, and the DTX corresponds to 2, etc. The UE may first convert the feedback set [$2_1$, $1_2$, $2_3$] into an integer L by using the formula $L=\Sigma_i 3^{i-1} \cdot a_i$, where $L=2*9+1*3+2=23$. Then the UE may convert the integer L into bits (e.g., binary representation), where 23=1*16+0*8+1*4+1*2+1=[1, 0, 1, 1, 1]. After converting the bi-state HARQ (sub)-codebook 918 and the tri-state HARQ (sub)-codebook 920 into bits, the UE may concatenate the two (sub)-codebooks 918 and 920, and may transmit the concatenated codebook to the base station, such as shown in FIG. 9. Each bi-state HARQ feedback may be 1 bit long, and each tri-state HARQ feedback may be more than 1 bit long (e.g., 2, 5, Mbits, etc.) depending on a number of states configured.

In another example, the UE may also be configured to convert the tri-state HARQ (sub)-codebook 920 into bits without first converting it into an integer. For example, the three states within the tri-state HARQ feedback may be represented by different bits, where the NACK may correspond to 00, ACK may correspond to 01 and DTX may correspond to 10, etc. Thus, as shown by a second path 924, the UE may convert the feedback set [DTX, ACK, DTX] to bits [10, 01, 10] without first converting the feedback set to an integer. Similarly, the UE may concatenate the two (sub)-codebooks 918 and 920 into one codebook after converting them into bits, and the UE may transmit the concatenated codebook to the base station, such as shown in FIG. 9.

While converting the feedback set (e.g., the first path 922) to an integer before converting it to bits may use less bits for the transmission (e.g., which uses 5 bits to represent the three tri-state HARQ feedbacks compared to 6 bits as shown by the example in the diagram 900), the length of the bits (e.g., after converted from the integer L) may be configured to be a fixed number to avoid ambiguity between the base station and the UE. For example, the length of the bits for a feedback set (e.g., codebook) may be calculated using $\lceil \log_2(3^N) \rceil$, where N denotes the number of tri-state feedbacks. Thus, in FIG. 9, as there are three tri-state feedbacks (e.g., N=3), the number of bits to represent the tri-state feedbacks may be 5 bits long (e.g., $\lceil \log_2(3^3) \rceil = 5$). However, when the number of converted bits is less than 5 bits (e.g., when the integer L is smaller than 16), the UE may pad zeros to the beginning of the bits in order to provide a fixed number of bits (e.g., to meet the specified 5 bits). For example, if the tri-state feedbacks are [1, 1, 0], L=1*9+1*3+0=12, and the integer 12 may be converted to the binary representation [1, 1, 0, 0]. As the length of the converted bits is less than 5 bits, the UE may add zero padding(s) to the converted bits so that the final bits to be used for the feedback is [0, 1, 1, 0, 0] (i.e., a zero is added to the front).

In another aspect of the present disclosure, a UE may multiplex the tri-state HARQ feedback with the bi-state HARQ feedback when the dynamic (e.g., Type 2) codebook is configured for the UE. In one example, when the Type 2 dynamic codebook is configured, the UE may be configured to generate two sub-codebooks. For example, a first sub-codebook may include the bi-state HARQ feedbacks and a second sub-codebook may include the tri-state HARQ feedbacks. By determining the HARQ feedback mode (e.g., bi-state or tri-state) of a transmission (e.g., through the decoded DCI or RRC), the UE may determine whether a particular scheduled feedback belongs to the first sub-codebook (e.g., for bi-state HARQ feedback) or to the second sub-codebook (i.e., tri-state HARQ feedback). Each of the first sub-codebook and the second sub-codebook may be generated by checking the corresponding DCIs, where the DAIs in the DCIs may be separately incremented or counted for each sub-codebook.

Figure 10:
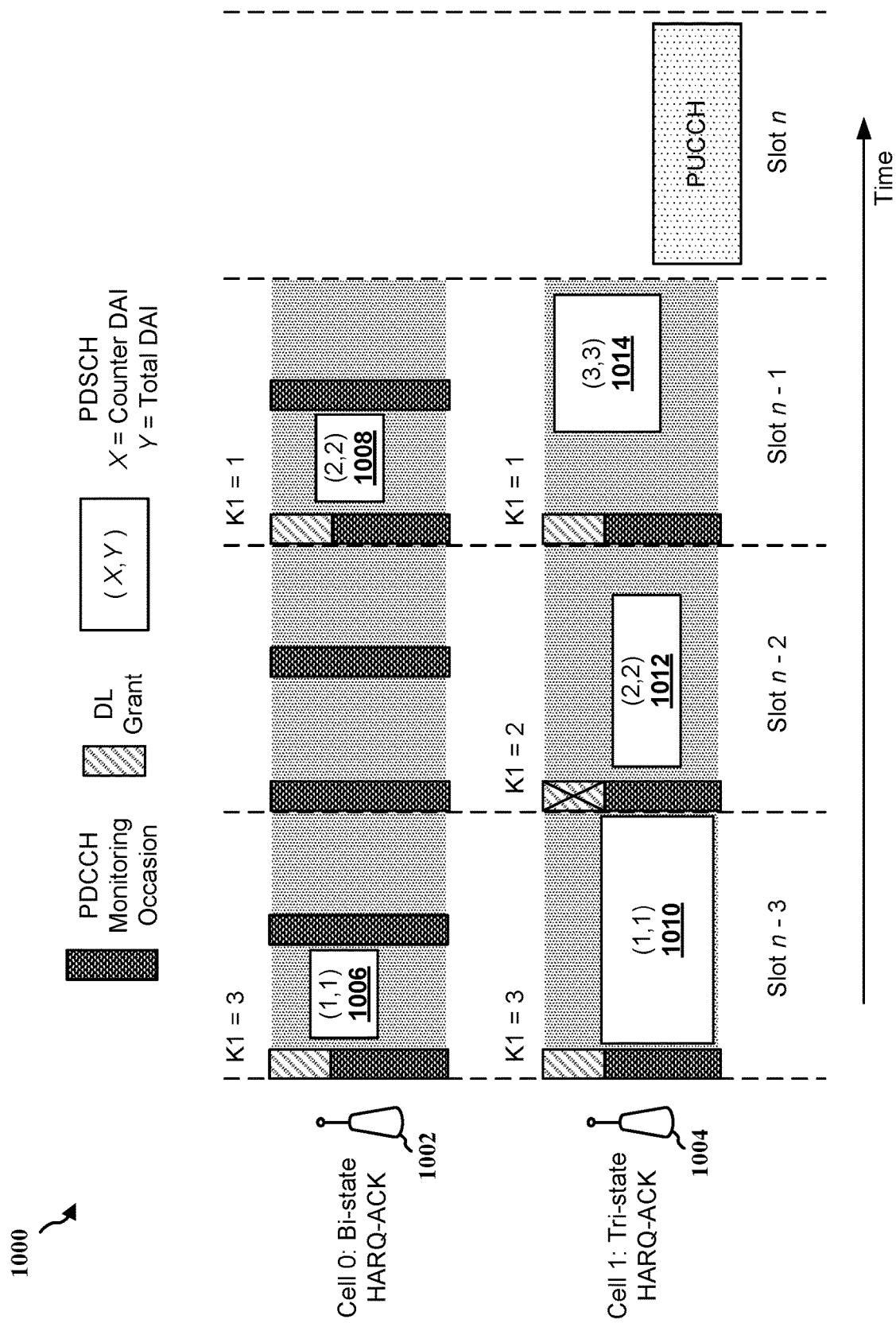
FIG. 10 is a diagram illustrating an example of using two sets of downlink assignment indexes (DAIs) for generating a first sub-codebook containing the bi-state HARQ feedbacks and a second sub-codebook containing the tri-state HARQ feedbacks in accordance with various aspects of the present disclosure.

FIG. 10 is a diagram 1000 illustrating an example of using two sets of DAIs for generating a first sub-codebook containing the bi-state HARQ feedbacks and a second sub-codebook containing the tri-state HARQ feedbacks in accordance with various aspects of the present disclosure. A base station may schedule five PDSCHs 1006, 1008, 1010, 1012, 1014 to be transmitted to a UE, where the PDSCHs 1006, 1008 are transmitted from a first cell 1002 that is configured with the bi-state HARQ feedback, and the PDSCHs 1010, 1012, 1014 are transmitted from a second cell 1004 that is configured with the tri-state HARQ feedback. The base station may assign a first set of DAIs for PDSCHs transmitted from the first cell 1002, and the base station may assign a second set of DAIs for PDSCHs transmitted from the second cell 1004, where each DAI parameter may further include a cDAI and a cDAI, such as described in connection with FIG. 7. For example, the base station may assign the first PDSCH (e.g., the PDSCH 1006) transmitted from the first cell 1002 with a DAI parameter (1, 1) (e.g., PDSCH #1, total PDSCH transmitted up to this point=1), and the base station may assign the second PDSCH (e.g., the PDSCH 1008) transmitted from the first cell 1002 with a DAI parameter (2, 2) (e.g., PDSCH #2, total PDSCH transmitted up to this point=2). Similarly, the base station may assign the first PDSCH (e.g., the PDSCH 1010) transmitted from the second cell 1004 with a DAI parameter (1, 1) (e.g., PDSCH #1, total PDSCH transmitted up to this point=1), the base station may assign the second PDSCH (e.g., the PDSCH 1012) transmitted from the second cell 1004 with a DAI parameter (2, 2) (e.g., PDSCH #2, total PDSCH transmitted up to this point=2), and the base station may assign the third PDSCH (e.g., the PDSCH 1014) transmitted from the second cell 1004 with a DAI parameter (3, 3) (e.g., PDSCH #3, total PDSCH transmitted up to this point=3). Based on the DAIs assigned to each PDSCH from the first cell 1002 and the second cell 1004, the UE may determine if there is any PDSCH missing, such as described in connection with FIG. 7, and the UE may provide the corresponding HARQ feedbacks for the PDSCHs.

Figure 11:
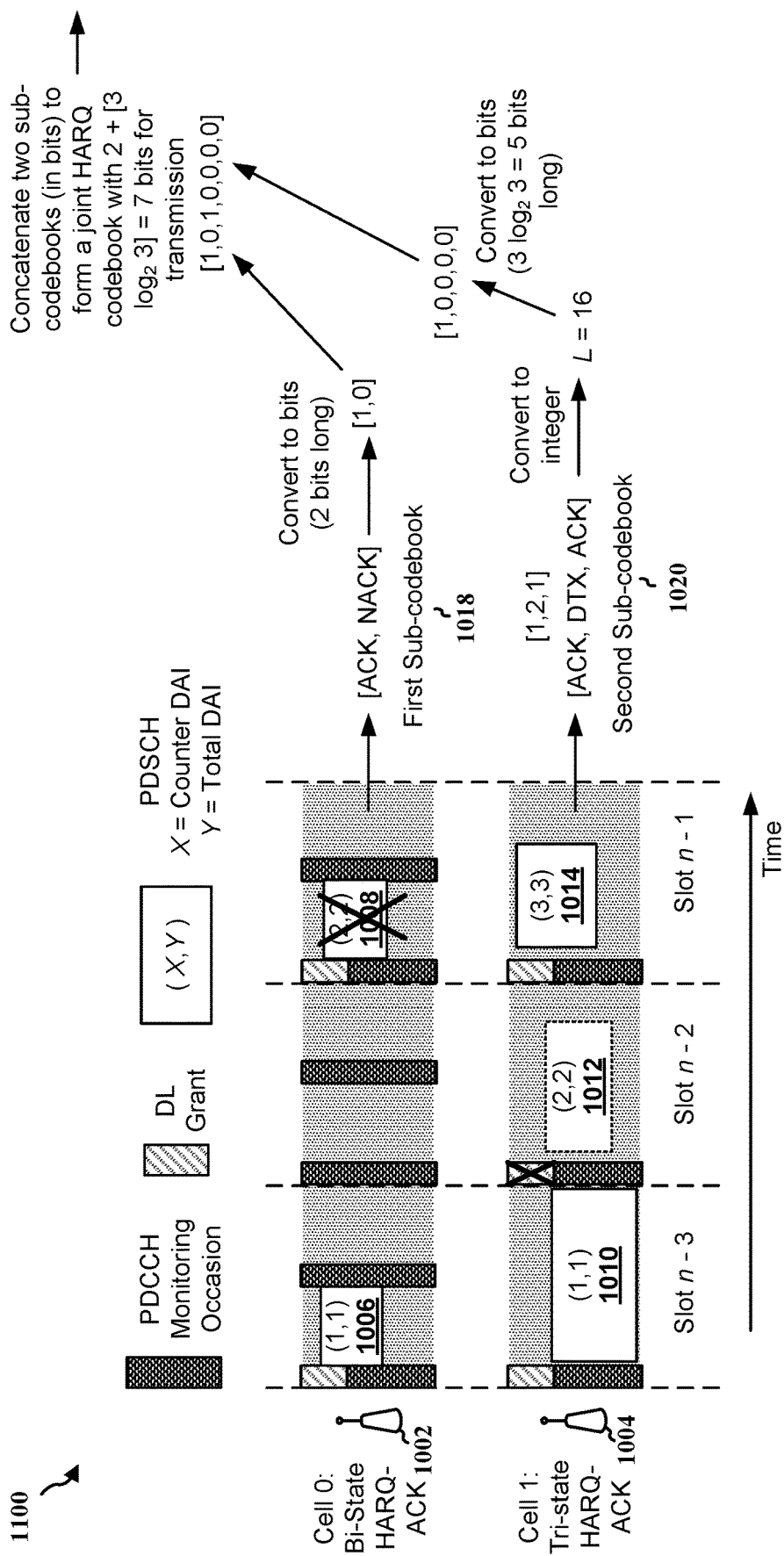
FIG. 11 is a diagram illustrating an example of multiplexing the tri-state HARQ feedback with the bi-state HARQ feedback in accordance with various aspects of the present disclosure.

For example, as shown by a diagram 1100 of FIG. 11, the UE may detect or receive both PDSCHs 1006 and 1008 transmitted from the first cell 1002, and the UE may successfully decode the PDSCH 1006 but may fail to decode the PDSCH 1008. Based on the decoding, the UE may generate two bi-state HARQ feedback bits (e.g., 1 bit per feedback) for the first sub-codebook 1018 (e.g., the first cell 1002). Similarly, the UE may detect or receives the PDSCHs 1010 and 1014 transmitted from the second cell 1004 and the UE may successfully decode both the PDSCHs 1010 and 1014. However, based on the DAIs associated with the PDSCH 1010 (e.g., (1, 1)) and the PDSCH 1014 (e.g., (3, 3)), the UE may determine that one PDSCH (e.g., the PDSCH 1012) is missing. In addition, the UE may also determine that the missing DCI (e.g., associated with the PDSCH 1012) schedules a tri-state HARQ feedback instead of a bi-state HARQ feedback, as the missing DCI may be detected by comparing the DAI values for the tri-state HARQ feedbacks. Based on this, the UE may generate three tri-state HARQ feedbacks for the second sub-codebook 1020 (e.g., the second cell 1004). Similarly, after determining the two sub-codebooks, the UE may concatenate the two sub-codebooks to form a joint HARQ codebook, and may transmit the joint HARQ codebook in one transmission (e.g., over PUCCH or PUSCH).

Similarly, the UE may first convert the tri-state HARQ feedbacks (e.g., Second Sub-codebook 1020) into one integer before converting it into bits to reduce number of bits for transmission, such as described in connection with FIG. 9. For example, the HARQ feedback set or sequence [ACK, DTX, ACK] may be represented by $[1_1, 2_2, 1_3]$ if an ACK corresponds to 1, a NACK corresponds to 0, and a DTX corresponds to 2, etc. The UE may first convert the feedback set $[1_1, 2_2, 1_3]$ into an integer L by using the formula $L=\Sigma_i 3^{i-1} \cdot a_i$, where L=1*9+2*3+1=16. Then the UE may convert the integer L into bits (e.g., binary representation), where 16=1*16+0*8+0*4+0*2+0=[1, 0, 0, 0, 0]. After converting the first sub-codebook 1018 and the second sub-codebook 1020 into bits, the UE may concatenate the two sub-codebooks 1018 and 1020, and may transmit the joint HARQ codebook to the base station, such as shown in FIG. 11. The size of the joint HARQ codebook may be 2 bits+⌈3 log₂ 3⌉ bits (e.g., 5 bits)=7 bits long, where the 2 bits is the size of the first sub-codebook 1018 (e.g., bi-state HARQ feedback) and the 5 bits is the size of the second sub-codebook 1020 (e.g., tri-state HARQ feedback). Note that the notation surround the ⌈3 log₂ 3⌉ is the ceiling operation in this example.

Alternatively, instead of concatenate the two sub-codebooks, the base station may schedule the UE to transmit the tri-state HARQ feedbacks and the bi-state HARQ feedbacks in separate PUCCHs. In one example, the base station may schedule the UE to transmit the tri-state HARQ feedbacks and the bi-state HARQ feedbacks in separate slots or sub-slot. In another example, the base station may dynamically or semi-statically indicate to the UE whether the tri-state HARQ feedback and the bi-state HARD feedback are to be multiplexed in a same transmission, or are to be separately transmitted on separate resources.

As discussed in connection with FIGS. 9 and 11, after forming the codebook $[a_0, \ldots, a_{K-1}]$, where $a_i \in \{ACK, NACK, DTX\}$ (e.g., $a_i$ is one of the three states), the UE may convert the codebook to bits before transmission and/or before concatenating two codebooks. In one aspect, the UE may convert a tri-state feedback sequence $[a_0, \ldots, a_{K-1}]$ to an integer using the equation: $L=\Sigma_i 3^{i-1} \cdot a_i$ or $L=\Sigma_i 3^{K-i-1} \cdot a_i$. For example, the three HARQ feedback states {ACK, NACK, DTX} may be mapped to {0, 1, 2}, such as shown in FIGS. 9 and 11. The integer L may then be converted to a binary string of length using ⌈log₂ 3^N⌉, where N denotes the number of tri-state HARQ-ACKs. For example, as shown by FIG. 11, the binary string length of the second sub-codebook may be ⌈log₂ 3³⌉=⌈3 log₂ 3⌉=5 bits long.

While examples described in connection with FIGS. 6 to 11 show that each PDSCH transmission contains one TB (e.g., one HARQ feedback per TB), and hence each bi-state HARQ feedback may be 1 bit long (e.g., each feedback=0 or 1), some network or base station may support a transmission mode where a PDSCH may contain multiple TBs (e.g., when there are more than 4 layers in the system). For example, if a PDSCH contains 2 TBs, the number of HARQ feedback states including the DTX state from the UE may increase to 5 (e.g., $2^2+1$): 1) ACK, ACK, 2) NACK, ACK, 3) ACK, NACK, 4) NACK, NACK, and 5) DTX, etc. Thus, the tri-state HARQ feedback described in connection with FIGS. 6 to 11 may be replaced with a five-state HARQ feedback instead when the PDSCH contains 2 TBs. Similarly, if there are N TBs in a PDSCH transmission, then the number of states to be feedback by the UE may be calculated by $2^N+1$.

Aspects presented herein may enable a UE to transmit at least a portion of the bi-state HARQ feedback and/or the tri-state HARQ feedback on a PUSCH. For example, in some cases, when the reporting of the bi-state HARQ feedback or the tri-state HARQ feedback on the PUCCH overlaps with a PUSCH transmission, the UE may transmit (e.g., piggyback) at least a portion of the bi-state HARQ feedback and/or the tri-state HARQ feedback on the PUSCH.

Figure 12:
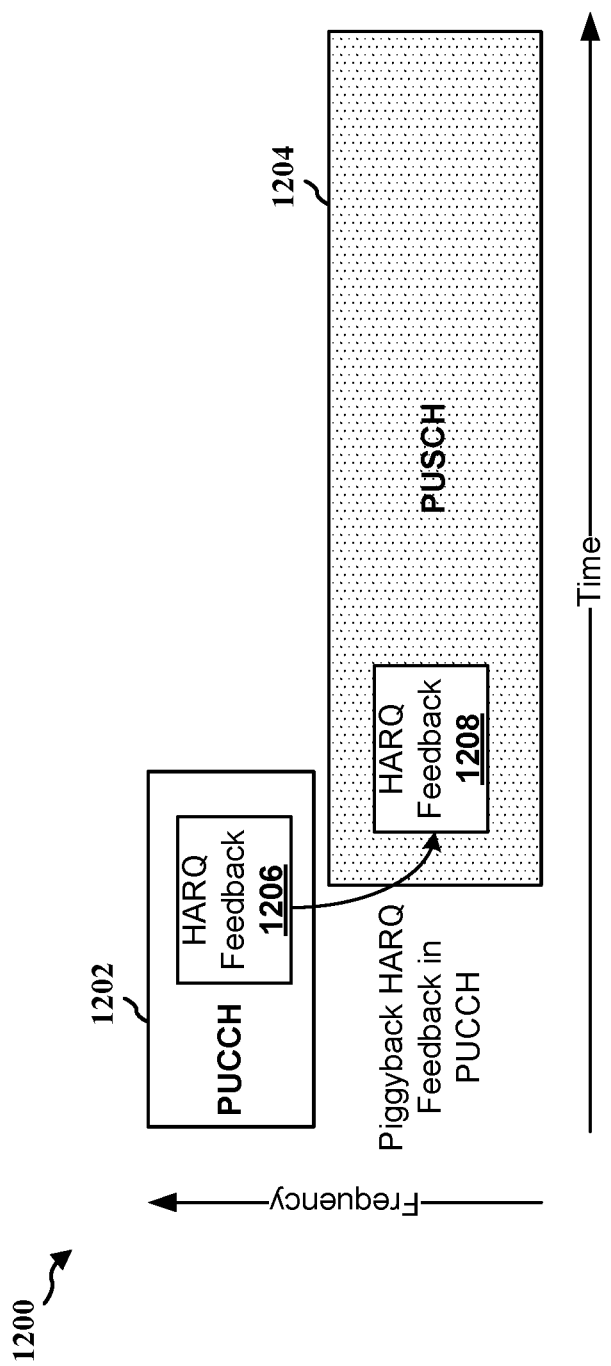
FIG. 12 is a diagram illustrating an example of piggyback the bi-state HARQ feedback or the tri-state HARQ feedback on the PUSCH in accordance with various aspects of the present disclosure.

FIG. 12 is a diagram 1200 illustrating an example of piggyback the bi-state HARQ feedback or the tri-state HARQ feedback on the PUSCH, where a UE may transmit a first portion 1206 of a bi-state and/or a tri-state HARQ feedback on a PUCCH 1202, and the UE may transmit a second portion 1208 of the bi-state and/or tri-state HARQ feedback on the corresponding PUSCH 1204. In some examples, a UE may be configured to transmit the second portion 1208 of the bi-state and/or the tri-state HARQ feedback on the PUSCH 1204 if the PUCCH 1202 at least partially overlaps with the PUSCH 1204 in time. In other words, the UE may be configured to piggyback the bi-state and/or the tri-state HARQ feedback on the PUSCH whenever the PUCCH overlaps in time with the PUSCH.

In some examples, the base station may indicate to the UE how many bits the UE is permitted to transmit on the PUSCH 1204. In one aspect, if the Type 1 semi-static codebook is configured for the UE, an indication (e.g., a 1 bit UL DAI or tDAI) may be included in the UL grant to indicate whether the UE is to piggyback the bi-state HARQ feedback and/or the tri-state HARQ feedback on the PUSCH or not. For example, as the UE may already know the size of the codebook under the Type 1 semi-static codebook configuration, based on the indication (e.g., UL DAI), the UE may determine whether to transmit the bi-state HARQ feedback and/or the tri-state HARQ feedback in the PUSCH. In another aspect, if the Type 2 dynamic codebook is configured for the UE, the base station may include two UL DAI values (e.g., 4 bits) in the UL grant to indicate the size of the bi-state HARQ feedback sub-codebook and the tri-state HARQ feedback sub-codebook. For example, as the UE may not know the size of the codebooks when the Type 2 dynamic codebook is configured for the UE, the first UL DAI value may be used for the first sub-codebook (i.e., for indicating the size of the bi-state HARQ feedback), and the second UL DAI value may be used for the second sub-codebook (i.e., for indicating the size of the tri-state HARQ feedback). Based on the UL DAI values, the UE may follow the respective UL DAIS to determine the codebook size for the first sub-codebook and the second sub-codebook. Then the UE may determine whether to transmit at least a portion of the first sub-codebook and/or the second sub-codebook in the PUSCH based on the codebook size.

In one other aspect of the present disclosure, different types of HARQ feedback (e.g., bi-state, tri-state, etc.) may be configured for different type of transmission or service type (e.g., URLLC, eMBB, etc.), and each type of transmission or service type may be assigned with different priorities. For example, a UE may be configured with the tri-state HARQ feedback for a first service type, such as the URLLC (e.g., through a higher-layer priority index indicating high priority), and the UE may also be configured with the bi-state HARQ feedback for a second service type, such as the eMBB (e.g., through a higher-layer priority index indicating low priority). If the HARQ feedback reporting for the transmission or service type with higher priority collides with the HARQ feedback reporting for the transmission or service type with lower priority in the same slot, the UE may not multiplex the HARQ feedback with higher priority with the HARQ feedback with lower priority. Instead, the UE may drop the HARQ feedback reporting with lower priority and transmit the HARQ feedback with higher priority. For example, if the tri-state HARQ feedback is configured for the URLLC with a higher priority and the bi-state HARQ feedback is configured for the eMBB with a lower priority, the UE may not multiplex the tri-state HARQ feedback with the bi-state HARQ feedback in the same slot when the tri-state HARQ feedback reporting collides with the bi-state HARQ feedback, and the UE may drop the bi-state HARQ feedback reporting.

Figure 13:
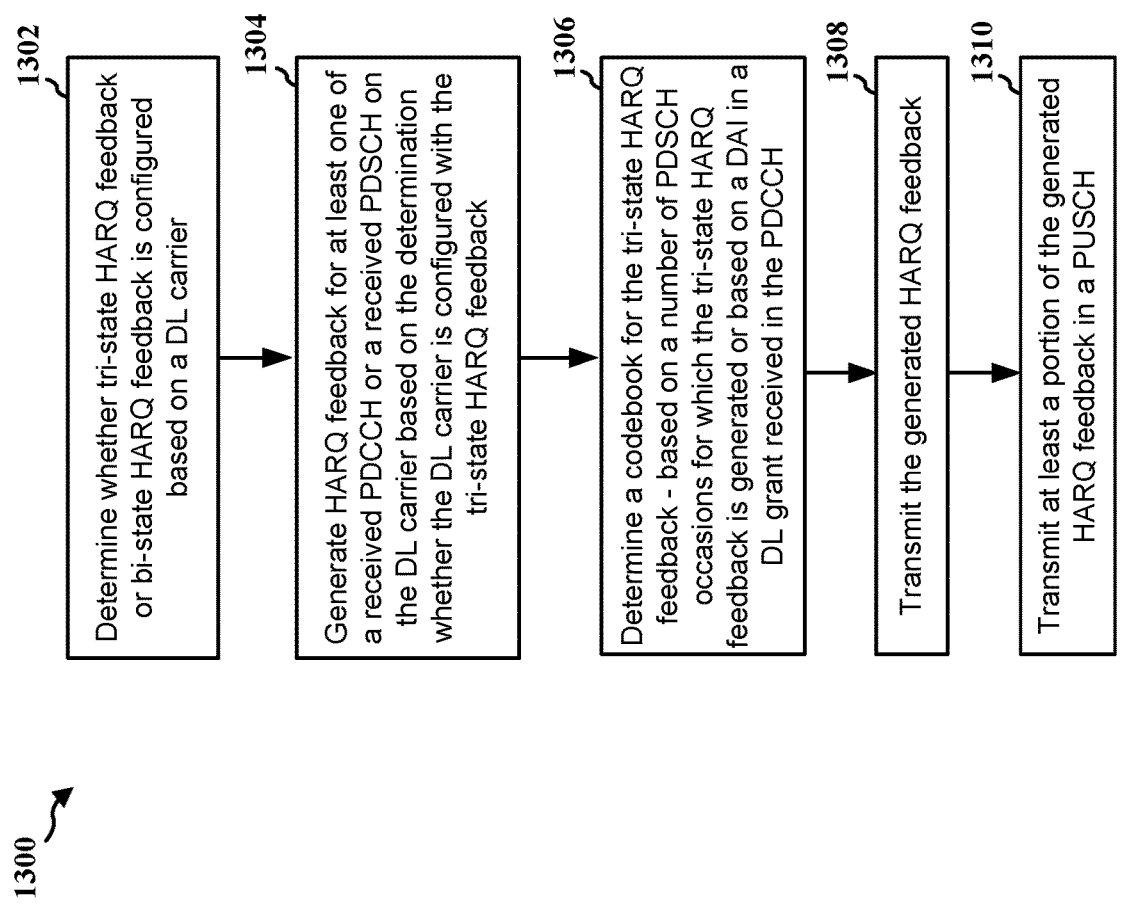
FIG. 13 is a flowchart of a method of wireless communication in accordance with aspects presented herein.

FIG. 13 is a flowchart of a method 1300 of wireless communication. The method may be performed by a UE or a component of a UE (e.g., the UE 104, 350, 402, 502; the apparatus 1502; a processing system, which may include the memory 360 and which may be the entire UE 350 or a component of the UE 350, such as the TX processor 368, the RX processor 356, and/or the controller/processor 359). The method may enable the UE to generate a tri-state HARQ feedback based on the decoding result of a PDCCH or a PDSCH, and the method may also enable the UE to construct a codebook for the tri-state HARQ feedback and multiplex the tri-state HARQ feedback with the bi-state HARQ feedback in a same transmission.

Figure 4:
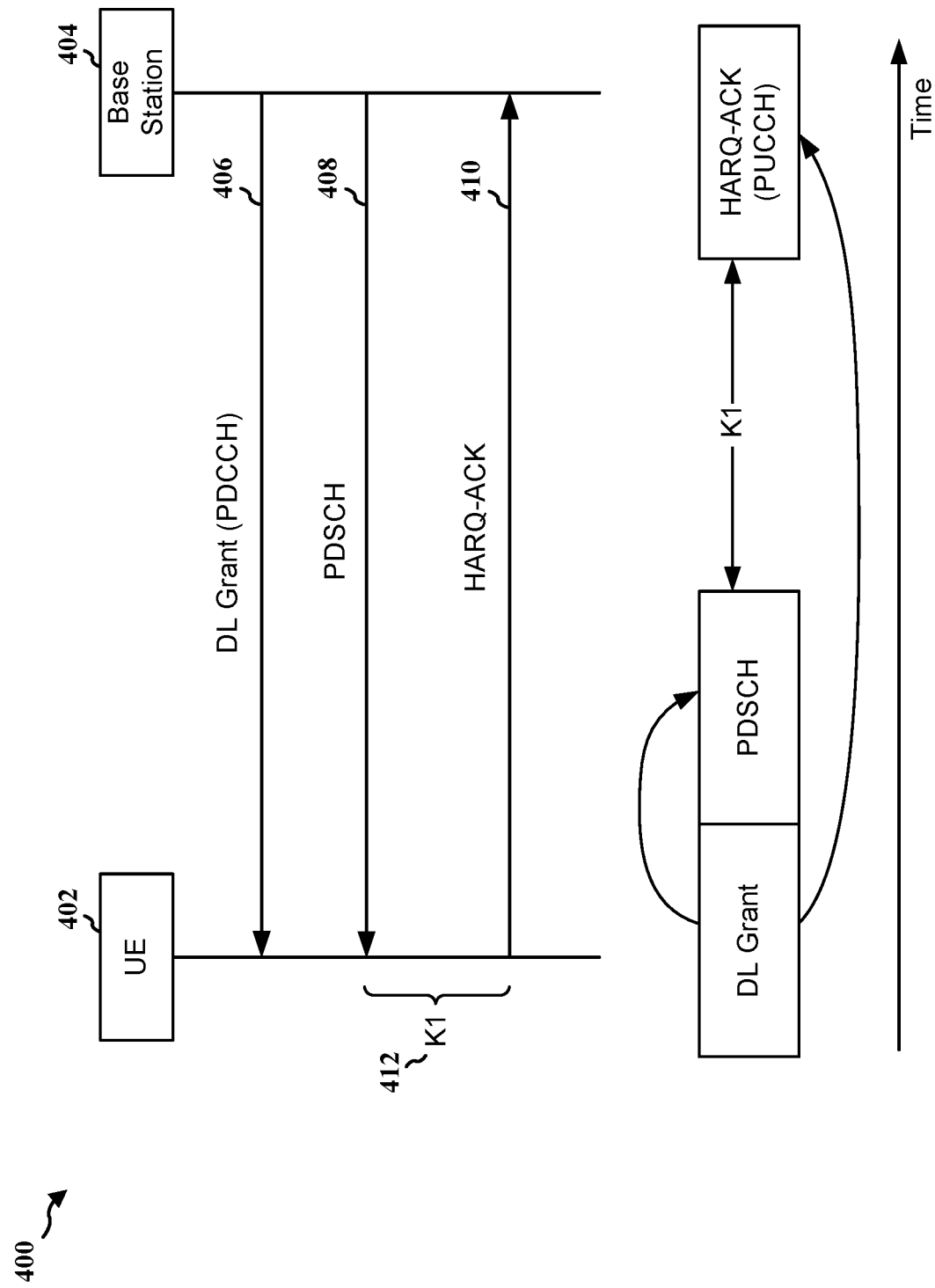
FIG. 4 is a communication flow illustrating an example of hybrid automatic repeat request (HARQ)-acknowledgement (ACK) (HARQ-ACK) reporting in accordance with various aspects of the present disclosure.

At 1302, the UE may determine whether tri-state HARQ feedback or bi-state HARQ feedback is configured based on a DL carrier, such as described in connection with FIGS. 4 and 5. For example, at 505, the UE may determine whether the DL carrier indicates a tri-state HARQ feedback or bi-state HARQ feedback to be used for the HARQ feedback reporting or configures the UE for tri-state HARQ feedback or bi-state HARQ feedback. The determination of whether tri-state HARQ feedback or bi-state HARQ feedback is configured may be performed by, e.g., the HARQ feedback type determination component 1540 of the apparatus 1502 in FIG. 15.

In some examples, the UE may determine whether to provide indicated tri-state HARQ feedback or bi-state HARQ feedback based on the DL carrier. In such examples, the DL carrier may include RRC or DCI (e.g., PDCCH). For example, as shown at 505 of FIG. 5, the UE 502 may determine whether a DL carrier is configured with the tri-state feedback. If the DL carrier is configured with the tri-state HARQ feedback, the UE may receive a configuration for the tri-state HARQ feedback on the DL carrier via RRC signaling. In another example, the UE may determine whether the HARQ feedback is to be generated using the tri-state HARQ feedback or the bi-state HARQ feedback based on a downlink control information (DCI) format of a DCI that schedules the tri-state HARQ feedback or the bi-state HARQ feedback.

At 1304, the UE may generate HARQ feedback for at least one of a received PDCCH or a received PDSCH on the DL carrier based on the determination whether the DL carrier is configured with the tri-state HARQ feedback, such as described in connection with FIG. 5. For example, at 509, the UE 502 may generate HARQ feedback for the received PDCCH or the received PDSCH based on whether the DL carrier is configured with the tri-state HARQ feedback (e.g., at 505). The generation of the HARQ feedback may be performed by, e.g., the HARQ feedback generation component 1542 of the apparatus 1502 in FIG. 15.

In one example, after the UE receives a DL grant in a PDCCH that schedules the corresponding PDSCH, the UE may generate the tri-state HARQ feedback when the DL carrier is configured with the tri-state HARQ feedback regardless of whether the DL grant indicates that the HARQ feedback should be bi-state HARQ feedback or the tri-state HARQ feedback. In such an example, the tri-state HARQ feedback may include one of an ACK indicating that a decode succeeded for the PDCCH and a decode succeeded for the PDSCH, a NACK for indicating that the decode succeeded for the PDCCH and that the decode failed for the PDSCH, or a DTX indicating that the decode failed for the PDCCH, such as described in connection with FIGS. 5 to 8.

In another example, when the HARQ feedback is the tri-state HARQ feedback, the UE may determine whether a PDSCH is received within a PDSCH monitoring occasion, and the UE may generate the HARQ feedback with the DTX state for the PDSCH if the PDSCH is not received within the PDSCH monitoring occasion, such as described in connection with FIG. 8.

In another example, when the HARQ feedback is the tri-state HARQ feedback, the UE may determine whether the PDCCH is correctly decoded based on one or more DAI values associated with one or more DL grant or one or more PDCCH, where the UE may generate the HARQ feedback with the DTX state for the PDCCH if the UE determines the PDCCH is not correctly decoded, such as described in connection with FIGS. 10 and 11. For example, the one or more DAI values may be consecutive and the UE may determine whether the PDCCH is correctly decoded based on comparing the one or more DAI values, such as described in connection with FIGS. 7 and 10.

At 1306, the UE may determine a codebook for the tri-state HARQ feedback based on a number of PDSCH occasions for which the tri-state HARQ feedback is generated or based on a DAI in a DL grant received in the PDCCH, such as described in connection with FIGS. 6 to 11. The determination of the codebook may be performed by, e.g., the HARQ codebook determination component 1544 of the apparatus 1502 in FIG. 15.

In one example, when the HARQ feedback is the tri-state HARQ feedback, the UE may determine a codebook for the tri-state HARQ feedback based on a number of PDSCH occasions for which the tri-state HARQ feedback is generated, such as described in connection with FIGS. 8 and 9. In another example, when the HARQ feedback is the tri-state HARQ feedback, the UE may determine a codebook for the tri-state HARQ feedback based on a DAI in a DL grant received in the PDCCH, such as described in connection with FIGS. 10 and 11. In some instances, the HARQ feedback may include both the tri-state HARQ feedback and the bi-state HARQ feedback. In one example, the tri-state HARQ feedback may be generated pursuant to a first HARQ codebook and the bi-state HARQ feedback may be generated pursuant to a second HARQ codebook, such as described in connection with FIGS. 8 to 9. In another example, the tri-state HARQ feedback may be generated pursuant to a first HARQ sub-codebook of an HARQ codebook and the bi-state HARQ feedback may be generated pursuant to a second HARQ sub-codebook of the HARQ codebook, such as described in connection with FIGS. 10 and 11. In one aspect, if the UE receives or is configured with the per HARQ process codebook configuration for the HARQ feedback, the UE may generate the HARQ feedback with the bi-state HARQ feedback.

At 1308, the UE may transmit the generated HARQ feedback to the base station, such as described in connection with FIGS. 4, 5, 9, 11 and 12. For example, the UE 402, 502 may transmit the generated HARQ feedback at 410, 510 to the base station 404, 505. The transmission of the generated HARQ feedback may be performed by, e.g., the HARQ feedback process component 1546 and/or the transmission component 1534 of the apparatus 1502 in FIG. 15.

In one example, if the HARQ feedback includes both the tri-state HARQ feedback and the bi-state HARQ feedback, the UE may transmit the tri-state HARQ feedback with the bi-state HARQ feedback in a same PUCCH, where the tri-state HARQ feedback and the bi-state HARQ feedback may be concatenated together for the transmission, such as described in connection with FIGS. 8 to 11. Prior to transmitting the HARQ feedback to the base station, the UE may first convert the HARQ feedback into bits. In one example, as described in connection with FIGS. 9 and 11, the UE may convert a sequence or a set of tri-state HARQ feedbacks corresponding to a HARQ codebook into an integer, and then the UE may convert the integer into bits before transmitting the tri-state HARQ feedback to the base station or before concatenating the tri-state feedback with the bi-state feedback. In other example, the UE may transmit the tri-state HARQ feedback in a first PUCCH, and the UE may transmit the bi-state HARQ feedback in a second PUCCH separate from the first PUCCH.

In one aspect, the UE may receive the PDSCH with N transport blocks, and the tri-state HARQ may be generated for the received PDSCH, where the generated tri-state HARQ feedback may indicate $2^N+1$ states. The $2^N+1$ states may include $2^N$ states that correspond to a combination of decoding results for the N transport blocks within the received PDSCH and 1 state indicating that the decode failed for the PDCCH.

At 1310, the UE may transmit the generated HARQ feedback or a portion of the generated HARQ feedback in a PUSCH. For example, the tri-state HARQ feedback may be transmitted in at least one of a PUCCH or a concurrent PUSCH, such as described in connection with FIG. 12. The transmission of the generated HARQ feedback or a portion of the generated HARQ feedback in a PUSCH may be performed by, e.g., the HARQ feedback configuration component 1548 and/or the transmission component 1534 of the apparatus 1502 in FIG. 15.

In one example, the UE may receive a DAI in a DL grant received in the PDCCH, where the tri-state HARQ feedback may be transmitted in at least one of the PUCCH or the concurrent PUSCH based on the received DAI. In another example, if the HARQ feedback includes both the tri-state HARQ feedback and the bi-state HARQ feedback, at least a portion of the tri-state HARQ feedback and the bi-state HARQ feedback may be transmitted in at least one of a PUCCH or a concurrent PUSCH, such as described in connection with FIG. 12. The UE may receive at least one DAI in a DL grant received in the PDCCH, where the tri-state HARQ feedback and the bi-state HARQ feedback may be transmitted in the PUCCH based on the received at least one DAI. The UE may also receive at least one DAI in an UL grant, where the tri-state HARQ feedback and the bi-state HARQ feedback are transmitted in the concurrent PUSCH based on the received at least one DAI. The at least one DAI may include a first DAI and a second DAI, the first DAI being for a first sub-codebook corresponding to the bi-state HARQ feedback and the second DAI being for a second sub-codebook corresponding to the tri-state HARQ feedback, such as described in connection with FIG. 12.

In one other aspect, the UE may be configured with the tri-state HARQ feedback for a first service type with a higher priority (e.g., through a higher-layer priority index indicating high priority), and the UE may also be configured with the bi-state HARQ feedback for a second service type with a lower priority (e.g., through a higher-layer priority index indicating low priority). Thus, the UE may generate tri-state HARQ feedback for the first service type and may generate the bi-state HARQ feedback for the second service type. If the UE determines that the tri-state HARQ feedback for the first service type is scheduled to be transmitted in a same slot as the bi-state HARQ feedback, the UE may drop the bi-state HARQ feedback from transmission. In one example, the first service type may be URLLC and the second service type may be MBB.

Figure 14:
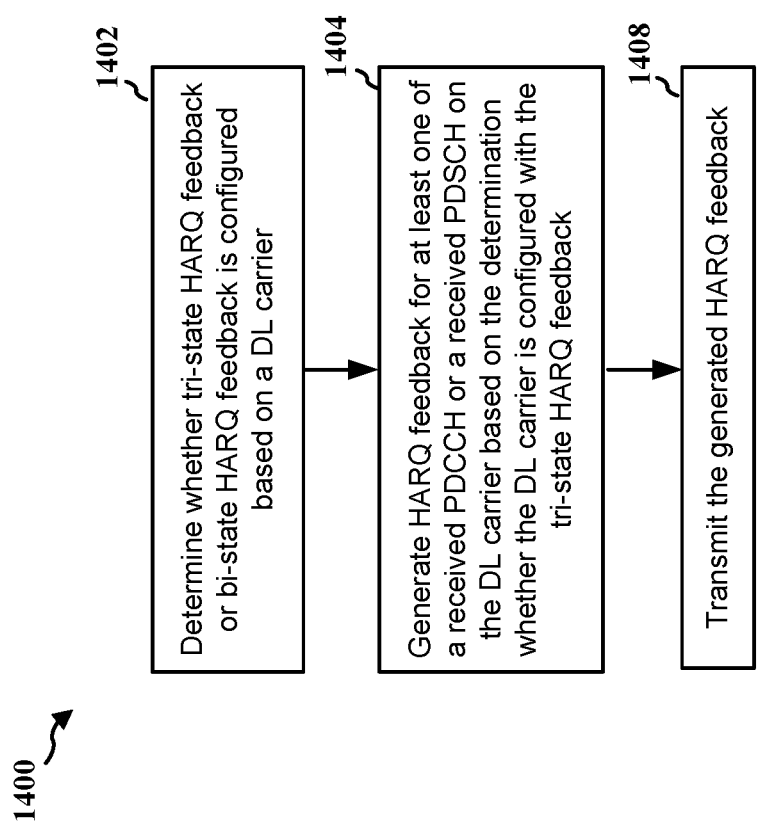
FIG. 14 is a flowchart of a method of wireless communication in accordance with aspects presented herein.

FIG. 14 is a flowchart of a method 1400 of wireless communication. The method may be performed by a UE or a component of a UE (e.g., the UE 104, 350, 402, 502; the apparatus 1502; a processing system, which may include the memory 360 and which may be the entire UE 350 or a component of the UE 350, such as the TX processor 368, the RX processor 356, and/or the controller/processor 359). The method may enable the UE to generate a tri-state HARQ feedback based on the decoding result of a PDCCH or a PDSCH, and the method may also enable the UE to construct a codebook for the tri-state HARQ feedback and multiplex the tri-state HARQ feedback with the bi-state HARQ feedback in a same transmission.

At 1402, the UE may determine whether tri-state HARQ feedback or bi-state HARQ feedback is configured based on a DL carrier, such as described in connection with FIGS. 4 and 5. For example, at 505, the UE may determine whether the DL carrier indicates a tri-state HARQ feedback or bi-state HARQ feedback to be used for the HARQ feedback reporting or configures the UE for tri-state HARQ feedback or bi-state HARQ feedback. The determination of whether tri-state HARQ feedback or bi-state HARQ feedback is configured may be performed by, e.g., the HARQ feedback type determination component 1540 of the apparatus 1502 in FIG. 15.

In some examples, the UE may determine whether to provide indicated tri-state HARQ feedback or bi-state HARQ feedback based on the DL carrier. In such examples, the DL carrier may include RRC or DCI (e.g., PDCCH). For example, as shown at 505 of FIG. 5, the UE 502 may determine whether a DL carrier is configured with the tri-state feedback. If the DL carrier is configured with the tri-state HARQ feedback, the UE may receive a configuration for the tri-state HARQ feedback on the DL carrier via RRC signaling. In another example, the UE may determine whether the HARQ feedback is to be generated using the tri-state HARQ feedback or the bi-state HARQ feedback based on a downlink control information (DCI) format of a DCI that schedules the tri-state HARQ feedback or the bi-state HARQ feedback.

At 1404, the UE may generate HARQ feedback for at least one of a received PDCCH or a received PDSCH on the DL carrier based on the determination whether the DL carrier is configured with the tri-state HARQ feedback, such as described in connection with FIG. 5. For example, at 509, the UE 502 may generate HARQ feedback for the received PDCCH or the received PDSCH based on whether the DL carrier is configured with the tri-state HARQ feedback (e.g., at 505). The generation of the HARQ feedback may be performed by, e.g., the HARQ feedback generation component 1542 of the apparatus 1502 in FIG. 15.

In one example, after the UE receives a DL grant in a PDCCH that schedules the corresponding PDSCH, the UE may generate the tri-state HARQ feedback when the DL carrier is configured with the tri-state HARQ feedback regardless of whether the DL grant indicates that the HARQ feedback should be bi-state HARQ feedback or the tri-state HARQ feedback. In such an example, the tri-state HARQ feedback may include one of an ACK indicating that a decode succeeded for the PDCCH and a decode succeeded for the PDSCH, a NACK for indicating that the decode succeeded for the PDCCH and that the decode failed for the PDSCH, or a DTX indicating that the decode failed for the PDCCH, such as described in connection with FIGS. 5 to 8.

In another example, when the HARQ feedback is the tri-state HARQ feedback, the UE may determine whether a PDSCH is received within a PDSCH monitoring occasion, and the UE may generate the HARQ feedback with the DTX state for the PDSCH if the PDSCH is not received within the PDSCH monitoring occasion, such as described in connection with FIG. 8.

In another example, when the HARQ feedback is the tri-state HARQ feedback, the UE may determine whether the PDCCH is correctly decoded based on one or more DAI values associated with one or more DL grant or one or more PDCCH, where the UE may generate the HARQ feedback with the DTX state for the PDCCH if the UE determines the PDCCH is not correctly decoded, such as described in connection with FIGS. 10 and 11. For example, the one or more DAI values may be consecutive and the UE may determine whether the PDCCH is correctly decoded based on comparing the one or more DAI values, such as described in connection with FIGS. 7 and 10.

In another example, the UE may determine a codebook for the tri-state HARQ feedback based on a number of PDSCH occasions for which the tri-state HARQ feedback is generated or based on a DAI in a DL grant received in the PDCCH, such as described in connection with FIGS. 6 to 11. The determination of the codebook may be performed by, e.g., the HARQ codebook determination component 1544 of the apparatus 1502 in FIG. 15.

In one example, when the HARQ feedback is the tri-state HARQ feedback, the UE may determine a codebook for the tri-state HARQ feedback based on a number of PDSCH occasions for which the tri-state HARQ feedback is generated, such as described in connection with FIGS. 8 and 9. In another example, when the HARQ feedback is the tri-state HARQ feedback, the UE may determine a codebook for the tri-state HARQ feedback based on a DAI in a DL grant received in the PDCCH, such as described in connection with FIGS. 10 and 11. In some instances, the HARQ feedback may include both the tri-state HARQ feedback and the bi-state HARQ feedback. In one example, the tri-state HARQ feedback may be generated pursuant to a first HARQ codebook and the bi-state HARQ feedback may be generated pursuant to a second HARQ codebook, such as described in connection with FIGS. 8 to 9. In another example, the tri-state HARQ feedback may be generated pursuant to a first HARQ sub-codebook of an HARQ codebook and the bi-state HARQ feedback may be generated pursuant to a second HARQ sub-codebook of the HARQ codebook, such as described in connection with FIGS. 10 and 11. In one aspect, if the UE receives or is configured with the per HARQ process codebook configuration for the HARQ feedback, the UE may generate the HARQ feedback with the bi-state HARQ feedback.

At 1408, the UE may transmit the generated HARQ feedback to the base station, such as described in connection with FIGS. 4, 5, 9, 11 and 12. For example, the UE 402, 502 may transmit the generated HARQ feedback at 410, 510 to the base station 404, 505. The transmission of the generated HARQ feedback may be performed by, e.g., the HARQ feedback process component 1546 and/or the transmission component 1534 of the apparatus 1502 in FIG. 15.

In one example, if the HARQ feedback includes both the tri-state HARQ feedback and the bi-state HARQ feedback, the UE may transmit the tri-state HARQ feedback with the bi-state HARQ feedback in a same PUCCH, where the tri-state HARQ feedback and the bi-state HARQ feedback may be concatenated together for the transmission, such as described in connection with FIGS. 8 to 11. Prior to transmitting the HARQ feedback to the base station, the UE may first convert the HARQ feedback into bits. In one example, as described in connection with FIGS. 9 and 11, the UE may convert a sequence or a set of tri-state HARQ feedbacks corresponding to a HARQ codebook into an integer, and then the UE may convert the integer into bits before transmitting the tri-state HARQ feedback to the base station or before concatenating the tri-state feedback with the bi-state feedback. In other example, the UE may transmit the tri-state HARQ feedback in a first PUCCH, and the UE may transmit the bi-state HARQ feedback in a second PUCCH separate from the first PUCCH.

In one aspect, the UE may receive the PDSCH with N transport blocks, and the tri-state HARQ may be generated for the received PDSCH, where the generated tri-state HARQ feedback may indicate $2^N+1$ states. The $2^N+1$ states may include $2^N$ states that correspond to a combination of decoding results for the N transport blocks within the received PDSCH and 1 state indicating that the decode failed for the PDCCH.

In another aspect, the UE may transmit the generated HARQ feedback or a portion of the generated HARQ feedback in a PUSCH. For example, the tri-state HARQ feedback may be transmitted in at least one of a PUCCH or a concurrent PUSCH, such as described in connection with FIG. 12. The transmission of the generated HARQ feedback or a portion of the generated HARQ feedback in a PUSCH may be performed by, e.g., the HARQ feedback configuration component 1548 and/or the transmission component 1534 of the apparatus 1502 in FIG. 15.

In one example, the UE may receive a DAI in a DL grant received in the PDCCH, where the tri-state HARQ feedback may be transmitted in at least one of the PUCCH or the concurrent PUSCH based on the received DAI. In another example, if the HARQ feedback includes both the tri-state HARQ feedback and the bi-state HARQ feedback, at least a portion of the tri-state HARQ feedback and the bi-state HARQ feedback may be transmitted in at least one of a PUCCH or a concurrent PUSCH, such as described in connection with FIG. 12. The UE may receive at least one DAI in a DL grant received in the PDCCH, where the tri-state HARQ feedback and the bi-state HARQ feedback may be transmitted in the PUCCH based on the received at least one DAI. The UE may also receive at least one DAI in an UL grant, where the tri-state HARQ feedback and the bi-state HARQ feedback are transmitted in the concurrent PUSCH based on the received at least one DAI. The at least one DAI may include a first DAI and a second DAI, the first DAI being for a first sub-codebook corresponding to the bi-state HARQ feedback and the second DAI being for a second sub-codebook corresponding to the tri-state HARQ feedback, such as described in connection with FIG. 12.

In one other aspect, the UE may be configured with the tri-state HARQ feedback for a first service type with a higher priority (e.g., through a higher-layer priority index indicating high priority), and the UE may also be configured with the bi-state HARQ feedback for a second service type with a lower priority (e.g., through a higher-layer priority index indicating low priority). Thus, the UE may generate tri-state HARQ feedback for the first service type and may generate the bi-state HARQ feedback for the second service type. If the UE determines that the tri-state HARQ feedback for the first service type is scheduled to be transmitted in a same slot as the bi-state HARQ feedback, the UE may drop the bi-state HARQ feedback from transmission. In one example, the first service type may be URLLC and the second service type may be MBB.

Figure 15:
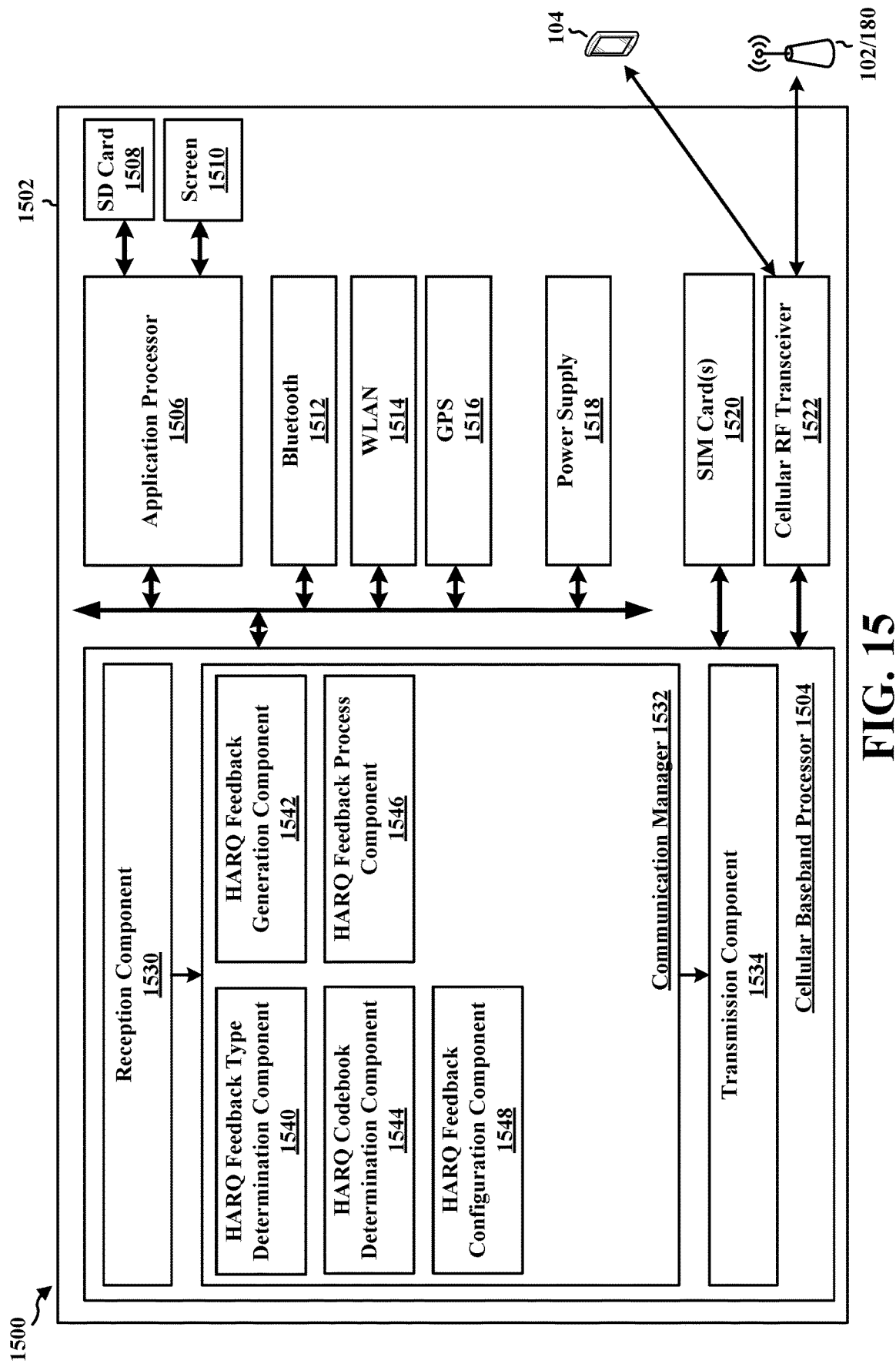
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a HARQ feedback type determination component 1540 that is configured to determine whether a DL carrier is configured with tri-state HARQ feedback or bi-state HARQ feedback, e.g., as described in connection with 1302 of FIG. 13 and/or 1402 of FIG. 14. The communication manager 1532 further includes a HARQ feedback generation component 1542 that is configured to generate HARQ feedback for at least one of a received PDCCH or a received PDSCH on the DL carrier based on the determination whether the DL carrier is configured with the tri-state HARQ feedback, e.g., as described in connection with 1304 of FIG. 13 and/or 1404 of FIG. 14.

The communication manager 1532 further includes a HARQ codebook determination component 1544 that is configured to determine a codebook for the tri-state HARQ feedback based on a number of PDSCH occasions for which the tri-state HARQ feedback is generated or based on a DAI in a DL grant received in the PDCCH, e.g., as described in connection with 1306 of FIG. 13. The communication manager 1532 further includes a HARQ feedback process component 1546 that is configured to transmit the generated HARQ feedback to the base station, e.g., as described in connection with 1308 of FIG. 13 and/or 1408 of FIG. 13. The communication manager 1532 further includes a HARQ feedback configuration component 1548 that is configured to transmit the generated HARQ feedback or a portion of the generated HARQ feedback in a PUSCH, e.g., as described in connection with 1310 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for determining whether tri-state HARQ feedback or bi-state HARQ feedback is configured based on a DL carrier (e.g., the HARQ feedback type determination component 1540). The apparatus 1502 includes means for generating HARQ feedback for at least one of a received PDCCH or a received PDSCH on the DL carrier based on the determination whether the DL carrier is configured with the tri-state HARQ feedback (e.g., the HARQ feedback generation component 1542). The apparatus 1502 includes means for determining a codebook for the tri-state HARQ feedback based on a number of PDSCH occasions for which the tri-state HARQ feedback is generated or based on a DAI in a DL grant received in the PDCCH (e.g., the HARQ codebook determination component 1544). The apparatus 1502 includes means for transmitting the generated HARQ feedback (e.g., the HARQ feedback process component 1546 and/or the transmission component 1534). The apparatus 1502 includes means for transmitting the generated HARQ feedback or a portion of the generated HARQ feedback in a PUSCH (e.g., the HARQ feedback configuration component 1548 and/or the transmission component 1534).

In one configuration, the HARQ feedback is tri-state HARQ feedback, the apparatus 1502 includes means for receiving a configuration for the tri-state HARQ feedback on the DL carrier via an RRC signaling.

In one configuration, the UE determines whether the HARQ feedback is to be generated using the tri-state HARQ feedback or the bi-state HARQ feedback based on a DCI format of a DCI that schedules the tri-state HARQ feedback or the bi-state HARQ feedback.

In one configuration, the HARQ feedback is tri-state HARQ feedback, the apparatus 1502 includes means for determining a codebook for the tri-state HARQ feedback based on a number of PDSCH occasions for which the tri-state HARQ feedback is generated.

In one configuration, the HARQ feedback is tri-state HARQ feedback, the apparatus 1502 includes means for determining a codebook for the tri-state HARQ feedback based on a DAI in a DL grant received in the PDCCH.

In one configuration, the tri-state HARQ feedback includes one of an ACK indicating that a decode succeeded for the PDCCH and a decode succeeded for the PDSCH, a NACK for indicating that the decode succeeded for the PDCCH and that the decode failed for the PDSCH, or a DTX indicating that the decode failed for the PDCCH.

In one configuration, the HARQ feedback is the tri-state HARQ feedback, the apparatus 1502 includes means for determining whether a PDSCH is received within a PDSCH monitoring occasion. The apparatus 1502 includes means for generating the HARQ feedback with the DTX for the PDSCH if the PDSCH is not received within the PDSCH monitoring occasion.

In one configuration, the HARQ feedback is the tri-state HARQ feedback, the apparatus 1502 includes means for determining whether the PDCCH is correctly decoded based on one or more DAI values associated with one or more DL grant or one or more PDCCH. The apparatus 1502 includes means for generating the HARQ feedback with the DTX for the PDCCH if the UE determines the PDCCH is not correctly decoded. In one configuration, the one or more DAI values are consecutive and the UE determines whether the PDCCH is correctly decoded based on comparing the one or more DAI values.

The apparatus 1502 includes means for receiving a DL grant in the PDCCH, the DL grant scheduling the PDSCH, where the UE generates the tri-state HARQ feedback when the DL carrier is configured with the tri-state HARQ feedback regardless of whether the DL grant indicates that the HARQ feedback should be bi-state HARQ feedback or the tri-state HARQ feedback.

In one configuration, the HARQ feedback is the tri-state HARQ feedback, the apparatus 1502 includes means for converting a sequence or a set of tri-state HARQ feedbacks corresponding to a HARQ codebook into an integer. The apparatus 1502 includes means for converting the integer into a set of bits.

In one configuration, the means for generating the HARQ feedback includes means for generating the tri-state HARQ feedback. In such configuration, the apparatus 1502 includes means for generating bi-state HARQ feedback. In one configuration, the tri-state HARQ feedback is transmitted with the bi-state HARQ feedback in a same PUCCH. In such configuration, the tri-state HARQ feedback and the bi-state HARQ feedback are concatenated together for the transmission. In such configuration, the tri-state HARQ feedback is converted to bits before the tri-state HARQ feedback and the bi-state HARQ feedback are concatenated together for the transmission.

In one configuration, the tri-state HARQ feedback is transmitted in a first PUCCH, and the apparatus 1502 includes means for transmitting the bi-state HARQ feedback in a second PUCCH separate from the first PUCCH. In one configuration, the tri-state HARQ feedback is generated pursuant to a first HARQ codebook and the bi-state HARQ feedback is generated pursuant to a second HARQ codebook. In one configuration, the tri-state HARQ feedback is generated pursuant to a first HARQ sub-codebook of an HARQ codebook and the bi-state HARQ feedback is generated pursuant to a second HARQ sub-codebook of the HARQ codebook.

The apparatus 1502 includes means for receiving the PDSCH, where the received PDSCH includes N transport blocks, and tri-state HARQ is generated for the received PDSCH, where the generated tri-state HARQ feedback indicates $2^N+1$ states. In such configuration, the $2^N+1$ states include $2^N$ states that correspond to a combination of decoding results for the N transport blocks within the received PDSCH and 1 state indicating that the decode failed for the PDCCH.

In one configuration, the HARQ feedback is tri-state HARQ feedback and is transmitted in at least one of a PUCCH or a concurrent PUSCH. In such configuration, the apparatus 1502 includes means for receiving a DAI in a DL grant received in the PDCCH, where the tri-state HARQ feedback is transmitted in at least one of the PUCCH or the concurrent PUSCH based on the received DAI.

In one configuration, the generated the HARQ feedback is tri-state HARQ feedback. In such configuration, the apparatus 1502 includes means for generating bi-state HARQ feedback, where the tri-state HARQ feedback and the bi-state HARQ feedback are transmitted in at least one of a PUCCH or a concurrent PUSCH. In such configuration, the apparatus 1502 includes means for receiving at least one DAI in a DL grant received in the PDCCH, where the tri-state HARQ feedback and the bi-state HARQ feedback are transmitted in the PUCCH based on the received at least one DAI. In such configuration, the at least one DAI includes a first DAI and a second DAI, the first DAI being for a first sub-codebook corresponding to the bi-state HARQ feedback and the second DAI being for a second sub-codebook corresponding to the tri-state HARQ feedback.

The apparatus 1502 includes means for receiving at least one DAI in a UL grant, where the tri-state HARQ feedback and the bi-state HARQ feedback are transmitted in the concurrent PUSCH based on the received at least one DAI. In one configuration, the at least one DAI includes a first DAI and a second DAI, the first DAI is for a first sub-codebook corresponding to the bi-state HARQ feedback and the second DAI is for a second sub-codebook corresponding to the tri-state HARQ feedback.

In one configuration, the generated HARQ feedback is tri-state HARQ feedback for a first service type with a higher priority, the apparatus 1502 includes means for generating bi-state HARQ feedback for a second service type with a lower priority. The apparatus 1502 includes means for determining that the tri-state HARQ feedback for the first service type is scheduled to be transmitted in a same slot as the bi-state HARQ feedback. The apparatus 1502 includes means for dropping the bi-state HARQ feedback from transmission. In one configuration, the first service type is URLLC and the second service type is eMBB.

In one configuration, when the HARQ feedback is tri-state HARQ feedback, the apparatus 1502 includes means for receiving a per HARQ process codebook configuration for the HARQ feedback. The apparatus 1502 includes means for generating the HARQ feedback with the bi-state HARQ feedback.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to determine whether tri-state HARQ feedback or bi-state HARQ feedback is configured based on a DL carrier; generate HARQ feedback for at least one of a received PDCCH or a received PDSCH on the DL carrier based on the determination whether the DL carrier is configured with the tri-state HARQ feedback; and transmit the generated HARQ feedback.

Aspect 2 is the apparatus of aspect 1, further including a transceiver coupled to the at least one processor.

Aspect 3 is the apparatus of any of aspects 1 and 2, where the HARQ feedback is tri-state HARQ feedback, the memory and the at least one processor being further configured to: receive a configuration for the tri-state HARQ feedback on the DL carrier via RRC signaling.

Aspect 4 is the apparatus of any of aspects 1 to 3, where the DL carrier is configured with the tri-state HARQ feedback, the memory and the at least one processor being further configured to: determine whether the HARQ feedback is to be generated using the tri-state HARQ feedback or the bi-state HARQ feedback based on a DCI format of a DCI that schedules the tri-state HARQ feedback or the bi-state HARQ feedback.

Aspect 5 is the apparatus of any of aspects 1 to 4, where the HARQ feedback is tri-state HARQ feedback, the memory and the at least one processor being further configured to determine a codebook for the tri-state HARQ feedback based on a number of PDSCH occasions for which the tri-state HARQ feedback is generated.

Aspect 6 is the apparatus of any of aspects 1 to 5, where the memory and the at least one processor are further configured to receive a DL grant in the PDCCH, the DL grant scheduling the PDSCH, where the UE generates the tri-state HARQ feedback when the DL carrier is configured with the tri-state HARQ feedback regardless of whether the DL grant indicates that the HARQ feedback should be bi-state HARQ feedback or the tri-state HARQ feedback.

Aspect 7 is the apparatus of any of aspects 1 to 6, where the HARQ feedback is tri-state HARQ feedback, the memory and the at least one processor being further configured to determine a codebook for the tri-state HARQ feedback based on a DAI in a DL grant received in the PDCCH.

Aspect 8 is the apparatus of any of aspects 1 to 7, where the HARQ feedback is the tri-state HARQ feedback, the memory and the at least one processor being further configured to: determine whether a PDSCH is received within a PDSCH monitoring occasion; and generate the HARQ feedback with the DTX for the PDSCH if the PDSCH is not received within the PDSCH monitoring occasion.

Aspect 9 is the apparatus of any of aspects 1 to 8, where the HARQ feedback is the tri-state HARQ feedback, the memory and the at least one processor being further configured to: determine whether a PDSCH is received within a PDSCH monitoring occasion; and generate the HARQ feedback with the DTX for the PDSCH if the PDSCH is not received within the PDSCH monitoring occasion.

Aspect 10 is the apparatus of any of aspects 1 to 9, where the HARQ feedback is the tri-state HARQ feedback, the memory and the at least one processor being further configured to: determine whether the PDCCH is correctly decoded based on one or more DAI values associated with one or more DL grant or one or more PDCCH; and generate the HARQ feedback with the DTX for the PDCCH if the UE determines the PDCCH is not correctly decoded.

Aspect 11 is the apparatus of any of aspects 1 to 10, where the one or more DAI values are consecutive and the memory and the at least one processor determines whether the PDCCH is correctly decoded based on comparing the one or more DAI values.

Aspect 12 is the apparatus of any of aspects 1 to 11, where the HARQ feedback is the tri-state HARQ feedback, the memory and the at least one processor being further configured to: convert a sequence or a set of tri-state HARQ feedbacks corresponding to a HARQ codebook into an integer; and convert the integer into a set of bits.

Aspect 13 is the apparatus of any of aspects 1 to 12, where the memory and the at least one processor are configured to generate at least one of the HARQ feedback, the tri-state HARQ feedback, or the bi-state HARQ feedback.

Aspect 14 is the apparatus of any of aspects 1 to 13, where the tri-state HARQ feedback is transmitted with the bi-state HARQ feedback in a same PUCCH.

Aspect 15 is the apparatus of any of aspects 1 to 14, where the tri-state HARQ feedback and the bi-state HARQ feedback are concatenated together for the transmission.

Aspect 16 is the apparatus of any of aspects 1 to 15, where the tri-state HARQ feedback is converted bits before the tri-state HARQ feedback and the bi-state HARQ feedback are concatenated together for the transmission.

Aspect 17 is the apparatus of any of aspects 1 to 16, where the tri-state HARQ feedback is transmitted in a first PUCCH, and the memory and the at least one processor are further configured to transmit the bi-state HARQ feedback in a second PUCCH separate from the first PUCCH.

Aspect 18 is the apparatus of any of aspects 1 to 17, where the tri-state HARQ feedback is generated pursuant to a first HARQ codebook and the bi-state HARQ feedback is generated pursuant to a second HARQ codebook.

Aspect 19 is the apparatus of any of aspects 1 to 18, where the tri-state HARQ feedback is generated pursuant to a first HARQ sub-codebook of an HARQ codebook and the bi-state HARQ feedback is generated pursuant to a second HARQ sub-codebook of the HARQ codebook.

Aspect 20 is the apparatus of any of aspects 1 to 19, where the memory and the at least one processor are further configured to receive the PDSCH, where the received PDSCH includes N transport blocks, and tri-state HARQ is generated for the received PDSCH, where the generated tri-state HARQ feedback indicates $2^N+1$ states.

Aspect 21 is the apparatus of any of aspects 1 to 20, where the $2^N+1$ states include $2^N$ states that correspond to a combination of decoding results for the N transport blocks within the received PDSCH and 1 state indicating that the decode failed for the PDCCH.

Aspect 22 is the apparatus of any of aspects 1 to 21, where the HARQ feedback is tri-state HARQ feedback and is transmitted in at least one of a PUCCH or a concurrent PUSCH.

Aspect 23 is the apparatus of any of aspects 1 to 22, where the memory and the at least one processor are further configured to receive a DAI in a DL grant received in the PDCCH, where the tri-state HARQ feedback is transmitted in at least one of the PUCCH or the concurrent PUSCH based on the received DAI.

Aspect 24 is the apparatus of any of aspects 1 to 23, where the generated the HARQ feedback is tri-state HARQ feedback, the memory and the at least one processor being further configured to generate bi-state HARQ feedback, where the tri-state HARQ feedback and the bi-state HARQ feedback are transmitted in at least one of a PUCCH or a concurrent PUSCH.

Aspect 25 is the apparatus of any of aspects 1 to 24, where the memory and the at least one processor are further configured to receive at least one DAI in a DL grant received in the PDCCH, where the tri-state HARQ feedback and the bi-state HARQ feedback are transmitted in the PUCCH based on the received at least one DAI.

Aspect 26 is the apparatus of any of aspects 1 to 25, where the at least one DAI includes a first DAI and a second DAI, the first DAI being for a first sub-codebook corresponding to the bi-state HARQ feedback and the second DAI being for a second sub-codebook corresponding to the tri-state HARQ feedback.

Aspect 27 is the apparatus of any of aspects 1 to 26, where the memory and the at least one processor are further configured to receive at least one DAI in an UL grant, where the tri-state HARQ feedback and the bi-state HARQ feedback are transmitted in the concurrent PUSCH based on the received at least one DAI.

Aspect 28 is the apparatus of any of aspects 1 to 27, where the at least one DAI includes a first DAI and a second DAI, the first DAI being for a first sub-codebook corresponding to the bi-state HARQ feedback and the second DAI being for a second sub-codebook corresponding to the tri-state HARQ feedback.

Aspect 29 is the apparatus of any of aspects 1 to 28, where the generated HARQ feedback is tri-state HARQ feedback for a first service type with a higher priority, the memory and the at least one processor being further configured to: generate bi-state HARQ feedback for a second service type with a lower priority; determine that the tri-state HARQ feedback for the first service type is scheduled to be transmitted in a same slot as the bi-state HARQ feedback; and drop the bi-state HARQ feedback from transmission.

Aspect 30 is the apparatus of any of aspects 1 to 29, where the first service type is URLLC and the second service type is eMBB.

Aspect 31 is the apparatus of any of aspects 1 to 30, where the HARQ feedback is tri-state HARQ feedback, the memory and the at least one processor being further configured to: receive a per HARQ process codebook configuration for the HARQ feedback; and generate the HARQ feedback with the bi-state HARQ feedback.

Aspect 32 is a method of wireless communication for implementing any of aspects 1 to 31.

Aspect 33 is an apparatus for wireless communication including means for implementing any of aspects 1 to 31.

Aspect 34 is a computer-readable medium storing computer executable code, where the code when executed by a processor causes the processor to implement any of aspects 1 to 31.

What is claimed is:

1. An apparatus for wireless communication performed at a user equipment (UE), comprising:
 memory; and
 at least one processor coupled to the memory, the memory and the at least one processor configured to:
  determine tri-state hybrid automatic repeat request (HARQ) feedback is configured based on a downlink (DL) carrier;
  generate the tri-state HARQ feedback for at least one of a received physical downlink control channel (PDCCH) or a received physical downlink shared channel (PDSCH) on the DL carrier based on the determination that the DL carrier is configured with the tri-state HARQ feedback, wherein the tri-state HARQ feedback includes a discontinuous transmission (DTX) state that indicates the received PDCCH is not successfully decoded;
  determine a codebook for the tri-state HARQ feedback based on a number of PDSCH occasions for which the tri-state HARQ feedback is generated or based on a downlink assignment indicator (DAI) in a DL grant received in the PDCCH; and
  transmit the generated tri-state HARQ feedback based on the codebook.

2. The apparatus of claim 1, wherein the memory and the at least one processor are further configured to:
 receive a configuration for the tri-state HARQ feedback on the DL carrier via a radio resource control (RRC) signaling.

3. The apparatus of claim 1, wherein the memory and the at least one processor are further configured to:
 determine the tri-state HARQ feedback is to be generated based on a downlink control information (DCI) format of a DCI that schedules the tri-state HARQ feedback.

4. The apparatus of claim 1, wherein the memory and the at least one processor are further configured to receive a DL grant in the PDCCH, the DL grant scheduling the PDSCH, wherein the UE generates the tri-state HARQ feedback when the DL carrier is configured with the tri-state HARQ feedback regardless of whether the DL grant indicates a HARQ feedback should be bi-state HARQ feedback or the tri-state HARQ feedback.

5. The apparatus of claim 1, wherein the tri-state HARQ feedback further comprises one of:
 an acknowledgment (ACK) state indicating that the received PDCCH and the received PDSCH are successfully decoded, or
 a negative acknowledgment (NACK) state for indicating that the received PDCCH is successfully decoded and that the received PDSCH is not successfully decoded.

6. The apparatus of claim 5, wherein the memory and the at least one processor are further configured to:
 determine whether a PDSCH is received within a PDSCH monitoring occasion; and
 generate the tri-state HARQ feedback with the DTX for the PDSCH if the PDSCH is not received within the PDSCH monitoring occasion.

7. The apparatus of claim 5, wherein the memory and the at least one processor are further configured to:
 determine whether the PDCCH is correctly decoded based on one or more DAI values associated with one or more DL grant or one or more PDCCH; and
 generate the tri-state HARQ feedback with the DTX for the PDCCH if the UE determines the PDCCH is not correctly decoded.

8. The apparatus of claim 7, wherein the one or more DAI values are consecutive and the memory and the at least one processor determines whether the PDCCH is correctly decoded based on comparing the one or more DAI values.

9. The apparatus of claim 1, wherein the memory and the at least one processor are further configured to:
 convert a sequence or a set of tri-state HARQ feedbacks corresponding to a HARQ codebook into an integer; and
 convert the integer into a set of bits.

10. The apparatus of claim 1, wherein the memory and the at least one processor are configured to generate at least the tri-state HARQ feedback and bi-state HARQ feedback.

11. The apparatus of claim 10, wherein the tri-state HARQ feedback is configured to be transmitted with the bi-state HARQ feedback in a same physical uplink control channel (PUCCH).

12. The apparatus of claim 11, wherein the tri-state HARQ feedback and the bi-state HARQ feedback are concatenated together for transmission.

13. The apparatus of claim 12, wherein the tri-state HARQ feedback is converted to bits before the tri-state HARQ feedback and the bi-state HARQ feedback are concatenated together for the transmission.

14. The apparatus of claim 10, wherein the tri-state HARQ feedback is configured to be transmitted in a first physical uplink control channel (PUCCH), and the memory and the at least one processor are further configured to transmit the bi-state HARQ feedback in a second PUCCH separate from the first PUCCH.

15. The apparatus of claim 10, wherein the tri-state HARQ feedback is generated pursuant to a first HARQ codebook and the bi-state HARQ feedback is generated pursuant to a second HARQ codebook.

16. The apparatus of claim 10, wherein the tri-state HARQ feedback is generated pursuant to a first HARQ sub-codebook of an HARQ codebook and the bi-state HARQ feedback is generated pursuant to a second HARQ sub-codebook of the HARQ codebook.

17. The apparatus of claim 1, wherein the memory and the at least one processor are further configured to receive the PDSCH, wherein the received PDSCH includes N transport blocks, and tri-state HARQ is generated for the received PDSCH, wherein the generated tri-state HARQ feedback indicates $2^N+1$ states.

18. The apparatus of claim 17, wherein the $2^N+1$ states comprise $2^N$ states that correspond to a combination of decoding results for the N transport blocks within the received PDSCH and 1 state indicating that the decode failed for the PDCCH.

19. The apparatus of claim 1, wherein to transmit the tri-state HARQ feedback, the memory and the at least one processor are configured to transmit the tri-state HARQ feedback in at least one of a physical uplink control channel (PUCCH) or a concurrent physical uplink shared channel (PUSCH).

20. The apparatus of claim 19, wherein the memory and the at least one processor are further configured to receive the DAI in the DL grant received in the PDCCH, wherein the tri-state HARQ feedback is configured to be transmitted in at least one of the PUCCH or the concurrent PUSCH based on the received DAI.

21. The apparatus of claim 1, wherein the memory and the at least one processor are further configured to generate bi-state HARQ feedback, wherein to transmit the tri-state HARQ feedback, the memory and the at least one processor are configured to transmit the tri-state HARQ feedback and the bi-state HARQ feedback in at least one of a physical uplink control channel (PUCCH) or a concurrent physical uplink shared channel (PUSCH).

22. The apparatus of claim 21, wherein the memory and the at least one processor are further configured to receive at least one DAI in the DL grant received in the PDCCH, wherein the tri-state HARQ feedback and the bi-state HARQ feedback are configured to be transmitted in the PUCCH based on the received at least one DAI.

23. The apparatus of claim 22, wherein the at least one DAI comprises a first DAI and a second DAI, the first DAI being for a first sub-codebook corresponding to the bi-state HARQ feedback and the second DAI being for a second sub-codebook corresponding to the tri-state HARQ feedback.

24. The apparatus of claim 1, wherein the generated tri-state HARQ feedback is for a first service type with a higher priority, the memory and the at least one processor are further configured to:
generate bi-state HARQ feedback for a second service type with a lower priority;
determine that the tri-state HARQ feedback for the first service type is scheduled to be transmitted in a same slot as the bi-state HARQ feedback; and
drop the bi-state HARQ feedback from transmission.

25. The apparatus of claim 1, further comprising a transceiver coupled to the at least one processor.

26. A method of wireless communication performed at a user equipment (UE), comprising:

determining tri-state hybrid automatic repeat request (HARQ) feedback is configured based on a downlink (DL) carrier;
generating the tri-state HARQ feedback for at least one of a received physical downlink control channel (PDCCH) or a received physical downlink shared channel (PDSCH) on the DL carrier based on the determination that the DL carrier is configured with the tri-state HARQ feedback, wherein the tri-state HARQ feedback includes a discontinuous transmission (DTX) state that indicates the received PDCCH is not successfully decoded;
determining a codebook for the tri-state HARQ feedback based on a number of PDSCH occasions for which the tri-state HARQ feedback is generated or based on a downlink assignment indicator (DAI) in a DL grant received in the PDCCH; and
transmitting the generated tri-state HARQ feedback based on the codebook.

27. An apparatus for wireless communication performed at a user equipment (UE), comprising:
means for determining tri-state hybrid automatic repeat request (HARQ) feedback is configured based on a downlink (DL) carrier;
means for generating the tri-state HARQ feedback for at least one of a received physical downlink control channel (PDCCH) or a received physical downlink shared channel (PDSCH) on the DL carrier based on the determination that the DL carrier is configured with the tri-state HARQ feedback, wherein the tri-state HARQ feedback includes a discontinuous transmission (DTX) state that indicates the received PDCCH is not successfully decoded;
means for determining a codebook for the tri-state HARQ feedback based on a number of PDSCH occasions for which the tri-state HARQ feedback is generated or based on a downlink assignment indicator (DAI) in a DL grant received in the PDCCH: and
means for transmitting generated the tri-state HARQ feedback based on the codebook.

28. A non-transitory computer-readable medium storing computer executable code for wireless communication performed at a user equipment (UE), the code when executed by a processor causes the processor to:
determine tri-state hybrid automatic repeat request (HARQ) feedback is configured based on a downlink (DL) carrier;
generate the tri-state HARQ feedback for at least one of a received physical downlink control channel (PDCCH) or a received physical downlink shared channel (PDSCH) on the DL carrier based on the determination that the DL carrier is configured with the tri-state HARQ feedback, wherein the tri-state HARQ feedback includes a discontinuous transmission (DTX) state that indicates the received PDCCH is not successfully decoded;
determine a codebook for the tri-state HARQ feedback based on a number of PDSCH occasions for which the tri-state HARQ feedback is generated or based on a downlink assignment indicator (DAI) in a DL grant received in the PDCCH: and
transmit the generated tri-state HARQ feedback based on the codebook.

* * * * *